United States Patent
Ramaswamy et al.

(10) Patent No.: US 12,184,913 B2
(45) Date of Patent: Dec. 31, 2024

(54) METHODS AND APPARATUS TO MEASURE EXPOSURE TO STREAMING MEDIA

(71) Applicant: The Nielsen Company (US), LLC, New York, NY (US)

(72) Inventors: Arun Ramaswamy, Tampa, FL (US); Alan Bosworth, Oldsmar, FL (US); Kevin K. Gaynor, Sunnyvale, CA (US); Narasimha Reddy Goli, Hyderabad (IN)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 18/593,860

(22) Filed: Mar. 1, 2024

(65) Prior Publication Data

US 2024/0205476 A1   Jun. 20, 2024

Related U.S. Application Data

(63) Continuation of application No. 18/158,335, filed on Jan. 23, 2023, now Pat. No. 11,968,413, which is a (Continued)

(51) Int. Cl.
*H04L 67/02* (2022.01)
*G06Q 30/02* (2023.01)
(Continued)

(52) U.S. Cl.
CPC ......... *H04N 21/2407* (2013.01); *G06Q 30/02* (2013.01); *H04L 65/00* (2013.01);
(Continued)

(58) Field of Classification Search
CPC ............. G06Q 30/02; H04N 21/25891; H04N 21/44008; H04N 21/812; H04N 21/44204; H04L 67/02; H04L 65/00; H04L 67/2823
(Continued)

(56) References Cited

U.S. PATENT DOCUMENTS

| T955,010 I4 | 2/1977 | Ragonese et al. |
| 4,943,963 A | 7/1990 | Waechter et al. |

(Continued)

FOREIGN PATENT DOCUMENTS

| AU | 5109300 A | 1/2001 |
| AU | 2011213606 A1 | 8/2012 |

(Continued)

OTHER PUBLICATIONS

E sources of information Marketing current of the Internet age the 6th time, I.M.press vol. 119 and JP, Mar. 25, 2006, 34-67 pages.

(Continued)

*Primary Examiner* — Anthony Mejia

(57) ABSTRACT

Methods and apparatus to measure exposure to streaming media are disclosed. An example apparatus includes for measurement of exposure to streaming media includes at least one memory, instructions in the apparatus, and processor circuitry to execute the instructions to: access metadata identifying media presented to a user, and cookie data, the metadata and the cookie data provided by a client device; determine whether the cookie data identifies the user to a database proprietor; in response to a determination that the cookie data does not identify the user to the database proprietor, send a redirect message instructing the client device to retransmit the metadata to a next-hop location; and in response to a determination that the cookie data does identify the user to the database proprietor, provide the metadata and a user identifier to a central facility.

20 Claims, 17 Drawing Sheets

Related U.S. Application Data continuation of application No. 17/456,538, filed on Nov. 24, 2021, now Pat. No. 11,563,994, which is a continuation of application No. 16/902,065, filed on Jun. 15, 2020, now Pat. No. 11,197,046, which is a continuation of application No. 16/436,476, filed on Jun. 10, 2019, now Pat. No. 10,687,100, which is a continuation of application No. 15/299,884, filed on Oct. 21, 2016, now Pat. No. 10,356,455, which is a continuation of application No. 15/082,991, filed on Mar. 28, 2016, now Pat. No. 9,503,784, which is a continuation of application No. 14/144,352, filed on Dec. 30, 2013, now Pat. No. 9,332,035.

(60) Provisional application No. 61/890,176, filed on Oct. 11, 2013, provisional application No. 61/889,505, filed on Oct. 10, 2013.

(51) Int. Cl.

| | | |
|---|---|---|
| *H04L 65/00* | (2022.01) | |
| *H04L 65/61* | (2022.01) | |
| *H04L 65/613* | (2022.01) | |
| *H04L 65/75* | (2022.01) | |
| *H04L 65/80* | (2022.01) | |
| *H04L 67/563* | (2022.01) | |
| *H04L 67/565* | (2022.01) | |
| *H04N 21/2387* | (2011.01) | |
| *H04N 21/24* | (2011.01) | |
| *H04N 21/258* | (2011.01) | |
| *H04N 21/44* | (2011.01) | |
| *H04N 21/442* | (2011.01) | |
| *H04N 21/45* | (2011.01) | |
| *H04N 21/61* | (2011.01) | |
| *H04N 21/81* | (2011.01) | |
| *H04N 21/8352* | (2011.01) | |
| *H04N 21/84* | (2011.01) | |
| *H04N 21/858* | (2011.01) | |

(52) U.S. Cl.
CPC ............ *H04L 65/61* (2022.05); *H04L 65/613* (2022.05); *H04L 65/764* (2022.05); *H04L 65/80* (2013.01); *H04L 67/02* (2013.01); *H04L 67/563* (2022.05); *H04L 67/565* (2022.05); *H04N 21/2387* (2013.01); *H04N 21/25883* (2013.01); *H04N 21/25891* (2013.01); *H04N 21/44008* (2013.01); *H04N 21/44204* (2013.01); *H04N 21/4532* (2013.01); *H04N 21/6125* (2013.01); *H04N 21/812* (2013.01); *H04N 21/8352* (2013.01); *H04N 21/84* (2013.01); *H04N 21/8586* (2013.01)

(58) Field of Classification Search
USPC ........................................................ 709/200
See application file for complete search history.

(56) References Cited

U.S. PATENT DOCUMENTS

| | | |
|---|---|---|
| 5,546,353 A | 8/1996 | Phillips et al. |
| 5,559,808 A | 9/1996 | Kostreski et al. |
| 5,695,009 A | 12/1997 | Hipp |
| 5,734,720 A | 3/1998 | Salganicoff |
| 5,793,410 A | 8/1998 | Rao |
| 5,812,928 A | 9/1998 | Watson, Jr. et al. |
| 5,822,533 A | 10/1998 | Saito et al. |
| 5,940,738 A | 8/1999 | Rao |
| 5,947,479 A | 9/1999 | Ostrowski |
| 5,951,694 A | 9/1999 | Choquier et al. |
| 6,073,241 A | 6/2000 | Rosenberg et al. |
| 6,144,988 A | 11/2000 | Kappel |
| 6,366,298 B1 | 4/2002 | Haitsuka et al. |
| 6,527,638 B1 | 3/2003 | Walker et al. |
| 7,143,195 B2 | 11/2006 | Vange et al. |
| 7,257,546 B2 | 8/2007 | Ebrahimi et al. |
| 7,805,332 B2 | 9/2010 | Wilson |
| 7,925,694 B2 | 4/2011 | Harris |
| 8,271,866 B2 | 9/2012 | Chen et al. |
| 8,504,411 B1 | 8/2013 | Subasic et al. |
| 8,688,524 B1 | 4/2014 | Ramalingam et al. |
| 8,751,461 B2 | 6/2014 | Abraham et al. |
| 8,859,076 B2 | 10/2014 | Carr et al. |
| 9,055,122 B2 | 6/2015 | Grecco et al. |
| 9,218,612 B2 | 12/2015 | Mazumdar et al. |
| 9,344,343 B2 | 5/2016 | Mazumdar et al. |
| 9,596,151 B2 | 3/2017 | Heffernan et al. |
| 9,842,339 B2 | 12/2017 | Kirkby et al. |
| 10,269,044 B2 | 4/2019 | Mazumdar et al. |
| 10,504,157 B2 | 12/2019 | Heffernan et al. |
| 11,068,944 B2 | 7/2021 | Mazumdar et al. |
| 11,563,994 B2 | 1/2023 | Ramaswamy et al. |
| 11,580,576 B2 | 2/2023 | Mazumdar et al. |
| 2001/0054004 A1 | 12/2001 | Powers |
| 2002/0029186 A1 | 3/2002 | Roth et al. |
| 2002/0134658 A1 | 9/2002 | Lah |
| 2002/0170814 A1 | 11/2002 | Lah |
| 2002/0184088 A1 | 12/2002 | Rosenberg |
| 2003/0163516 A1 | 8/2003 | Perkins et al. |
| 2004/0098229 A1 | 5/2004 | Error et al. |
| 2005/0144067 A1 | 6/2005 | Farahat et al. |
| 2005/0257141 A1 | 11/2005 | Brandrud et al. |
| 2006/0143068 A1 | 6/2006 | Calabria |
| 2006/0212350 A1 | 9/2006 | Ellis et al. |
| 2006/0282328 A1 | 12/2006 | Gerace et al. |
| 2007/0073585 A1 | 3/2007 | Apple et al. |
| 2007/0073833 A1 | 3/2007 | Roy et al. |
| 2007/0255618 A1 | 11/2007 | Meerbergen et al. |
| 2008/0000495 A1 | 1/2008 | Hansen et al. |
| 2008/0040653 A1 | 2/2008 | Levine |
| 2008/0086523 A1 | 4/2008 | Afergan et al. |
| 2008/0086524 A1 | 4/2008 | Afergan et al. |
| 2008/0228537 A1 | 9/2008 | Monfried et al. |
| 2009/0019148 A1 | 1/2009 | Britton et al. |
| 2009/0119167 A1 | 5/2009 | Kendall et al. |
| 2009/0132579 A1 | 5/2009 | Kwang |
| 2009/0144146 A1 | 6/2009 | Levine et al. |
| 2009/0248494 A1 | 10/2009 | Hueter et al. |
| 2009/0259666 A1 | 10/2009 | Tola et al. |
| 2009/0276667 A1 | 11/2009 | Dopson et al. |
| 2009/0292587 A1 | 11/2009 | Fitzgerald |
| 2009/0293001 A1 | 11/2009 | Lu et al. |
| 2010/0217665 A1 | 8/2010 | Sharma |
| 2010/0223119 A1 | 9/2010 | Klish |
| 2010/0228855 A1 | 9/2010 | Sim et al. |
| 2010/0241510 A1 | 9/2010 | Zhang |
| 2010/0313009 A1 | 12/2010 | Combet et al. |
| 2011/0052762 A1 | 3/2011 | Flieger et al. |
| 2011/0065881 A1 | 3/2011 | Iji et al. |
| 2011/0125593 A1 | 5/2011 | Wright et al. |
| 2011/0208660 A1 | 8/2011 | Erbey et al. |
| 2011/0314114 A1 | 12/2011 | Young, III et al. |
| 2012/0005015 A1 | 1/2012 | Park et al. |
| 2012/0026760 A1 | 2/2012 | Juhlin |
| 2013/0025687 A1 | 1/2013 | Al-Shammari |
| 2013/0046651 A1 | 2/2013 | Edson |
| 2013/0204694 A1 | 8/2013 | Banister et al. |
| 2014/0108130 A1 | 4/2014 | Vos et al. |
| 2014/0173646 A1 | 6/2014 | Ramaswamy |
| 2014/0317114 A1 | 10/2014 | Alla et al. |
| 2016/0027038 A1 | 1/2016 | Beyda et al. |
| 2017/0154366 A1 | 6/2017 | Turgeman |

FOREIGN PATENT DOCUMENTS

| | | |
|---|---|---|
| AU | 2011305429 A1 | 3/2013 |
| AU | 2011349435 A1 | 5/2013 |
| AU | 2013203898 A1 | 5/2013 |
| AU | 2017200423 A1 | 2/2017 |
| AU | 2018204318 A1 | 7/2018 |

(56) References Cited

FOREIGN PATENT DOCUMENTS

| | | |
|---|---|---|
| AU | 2020213400 A1 | 8/2020 |
| CN | 1745374 A | 3/2006 |
| CN | 1801727 A | 7/2006 |
| CN | 101222348 A | 7/2008 |
| CN | 101505247 A | 8/2009 |
| CN | 101617516 A | 12/2009 |
| CN | 101796504 A | 8/2010 |
| CN | 103119565 A | 5/2013 |
| CN | 105760782 A | 7/2016 |
| EP | 0744695 A2 | 11/1996 |
| EP | 1045547 A2 | 10/2000 |
| EP | 1193603 A1 | 4/2002 |
| EP | 1379044 A1 | 1/2004 |
| EP | 1379604 B1 | 2/2010 |
| JP | H10124428 A | 5/1998 |
| JP | 2002056280 A | 2/2002 |
| JP | 2002091852 A | 3/2002 |
| JP | 2002149693 A | 5/2002 |
| JP | 2003345940 A | 12/2003 |
| JP | 2007501454 A | 1/2007 |
| JP | 2008083906 A | 4/2008 |
| JP | 2009193473 A | 8/2009 |
| JP | 2009259119 A | 11/2009 |
| JP | 2010501939 A | 1/2010 |
| JP | 2010257448 A | 11/2010 |
| JP | 2021047867 A | 3/2021 |
| KR | 20100067611 A | 6/2010 |
| KR | 20110023293 A | 3/2011 |
| WO | 9809447 A2 | 3/1998 |
| WO | 0152168 A1 | 7/2001 |
| WO | 2009026395 A1 | 2/2009 |
| WO | 2009029940 A1 | 3/2009 |
| WO | 2009039242 A1 | 3/2009 |
| WO | 2014059319 A2 | 4/2014 |

OTHER PUBLICATIONS

Etgen et al., "What Does Getting WET (Web Event-logging tool) Mean for Web Usability?" Jun. 3, 1999, [online]. retrieved from the internet: <URL: http://zing.ncstnistgov/hfweb/proceedings/etgen-cantor/index.html>, 11 pages.
European Patent Office, Extended European Search Report, in connection with European Patent Application No. 22212841.5, issued on Jan. 30, 2023, 10 pages.
European Patent Office, Extended European Search Report, issued in connection with European Patent Application No. 11827473.7, dated Apr. 12, 2016, 9 pages.
European Patent Office, Extended European Search Report, issued in connection with European Patent Application No. 19163127.4, dated May 2, 2019, 11 Pages.
Garfinkel Simpson, Spa Ford A gene, Ando Susumu, The volume Miyoko Endo, Web security, and for privacy & commerce (above) users, Web security, privacy & commerce the 2nd edition the first edition, JP, O'Reilly Japan, Dec. 24, 2002, p. 244-249.
Hiroki Okazaki, "How to understand the effects of customer attraction to a website, and the method of measuring the affects," Web Strategy, Japan, MdN Corporation, Sep. 11, 2006, vol. 2, 10 pages.
International Searching Authority, International Preliminary Report on Patentability, issued in connection with PCT Serial No. PCT/US2012/026760, on Sep. 24, 2013, 4 pages.
International Searching Authority, International Search Report, issued in connection with PCT Serial No. PCT/US2011/052623, mailed Mar. 8, 2012, 3 pages.
International Searching Authority, International Search Report and Written Opinion, issued in connection with PCT Serial No. PCT/US2012/026760, mailed on Jan. 2, 2013, 3 pages.
International Searching Authority, International Search Report, issued in connection with PCT Serial No. PCT/US2013/025687, on Jun. 2, 2013, 3 pages.
International Searching Authority, Written Opinion of the International Searching Authority, issued in connection with International Patent Application No. PCT/US2011/052623, Mar. 8, 2012, 4 Pages.

International Searching Authority, Written Opinion of the International Searching Authority, issued in connection with PCT Serial No. PCT/US2013/025687, on Jun. 2, 2013, 5 pages.
International Searching Authority, Written Opinion, issued in connection with PCT Serial No. PCT/US2012/026760, mailed on Jan. 2, 2013, 3 pages.
Matt Doyle, Using Javascript's Location Object to Work with URLs, Jul. 28, 2008, Retrieved from the Internet: <URL: https://www.elated.com/using-javascripts-location-object-tow-work-with-urls/>, 12 pages.
Patent Cooperation Treaty, International Preliminary Report on Patentability Chapter I, issued on connection with International Patent Application No. PCT/US2011/052623, Apr. 4, 2013, 5 Pages.
Pouttu-Clarke, Matt, "J2EE patterns: Cross Domain Cookie Provider," The Server Side, Jan. 19, 2005, 12 pages, Retrieved from the Internet at http://www.theserverside.com/discussions/thread/31258.html].
Stack Overflow, access parent url from iframe, Aug. 21, 2010 [https://web.archive.org/web/20100821161311/stackoverflow.comiguestions/3420004/access-parent-url-from-iframel retrieved on Nov. 3, 2022, 2 pages.
Storing and Retrieving non 3rd Party Cookies Across Multiple Domains, Google Answers, Jun. 30, 2006, retrieved from http://answers.google.com/answers/threadview/id/742376.html, 4 pages.
United States Patent and Trademark Office, "Non-Final Office Action," issued in connection with U.S. Appl. No. 14/981,448, Mar. 13, 2018, 14 pages.
United States Patent and Trademark Office, "Non-Final Office Action," issued in connection with U.S. Appl. No. 18/168,327, Jun. 4, 2024, 05 pages.
United States Patent and Trademark Office, Final Office Action, issued in connection with U.S. Appl. No. 14/981,448, on Sep. 11, 2018, 4 pages.
United States Patent and Trademark Office, Final Office Action, issued in connection with U.S. Appl. No. 16/374,533, filed Apr. 9, 2020, 5 pages.
United States Patent and Trademark Office, Final Office Action, issued in connection with U.S. Appl. No. 13/690,915, dated Dec. 20, 2013, 6 pages.
United States Patent and Trademark Office, Non-Final Office Action, issued in connection with U.S. Appl. No. 13/239,005, on Jun. 4, 2013, 11 pages.
United States Patent and Trademark Office, Non-Final Office Action, issued in connection with U.S. Appl. No. 13/396,071, on May 9, 2014, 14 pages.
United States Patent and Trademark Office, Non-Final Office Action, issued in connection with U.S. Appl. No. 13/690,915, on Sep. 5, 2013, 13 pages.
United States Patent and Trademark Office, Non-Final Office Action, issued in connection with U.S. Appl. No. 13/691,175, on Sep. 9, 2013, 7 pages.
United States Patent and Trademark Office, Non-Final Office Action, issued in connection with U.S. Appl. No. 13/756,493, on Jan. 17, 2014, 7 pages.
United States Patent and Trademark Office, Non-Final Office Action, issued in connection with U.S. Appl. No. 14/500,297, on Jan. 5, 2015, 6 pages.
United States Patent and Trademark Office, Non-Final Office Action, issued in connection with U.S. Appl. No. 16/374,533, filed Dec. 30, 2019, 6 pages.
Vsvaidya, Cookie Synching, Admonsters, Apr. 20, 2010, [retrieved from <https://www.admonsters.com/cookie-synching/> on Jun. 29, 2023], 11 pages.
Wikipedia "Same-origin policy," Aug. 28, 2010, [https://en.wikipedia.org/w/index.php?title=Same-.prigin_policy&oldid=381559205] retrieved on Nov. 3, 2022, 3 pages.
With an access number, it is from a number and the nature customer gathering technique to evaluation of effectiveness. The wisdom of site customer gathering, ** , Web Strategy vol. Sep. 5, Feb. 2006.
Yugawa, T., Next Generation Marketing Platform, Japan, Softbank Creative Corporation, Oct. 6, 2008, 1st Edition, p. 160, 5 pages.

| | MEDIA IDENTIFIER 1071 | USER IDENTIFIER 1072 | TIMESTAMP 1073 |
|---|---|---|---|
| 1074 | MEDIA 0001 | USER A | 2013-10-11 11:11:03AM |
| 1075 | MEDIA 0001 | USER B | 2013-10-11 2:43:54PM |
| 1076 | MEDIA 0001 | USER C | 2013-10-11 3:45:30PM |
| 1077 | MEDIA 0002 | USER A | 2013-10-11 11:15:32AM |
| 1078 | MEDIA 0002 | USER D | 2013-10-12 09:13:13AM |
| | ... | ... | ... |

| | USER IDENTIFIER | AGE | INCOME |
|---|---|---|---|
| 1085 | USER A | 24 | $30,000 per year |
| 1086 | USER B | 32 | $92,000 per year |
| 1087 | USER C | 48 | $45,000 per year |
| 1088 | USER D | 63 | $47,000 per year |
| | ... | ... | ... |

| | 1090 | 1091 | 1092 | 1093 | 1094 | 1095 | 1096 | 1097 |
|---|---|---|---|---|---|---|---|---|
| | MEDIA IDENTIFIER | AGE (under 20) | AGE (20-40) | AGE (40-60) | AGE (over 60) | INCOME (under $40K per year) | INCOME ($40K-$80K per year) | INCOME (over $80K per year) |
| 1098 | MEDIA 0001 | 0 | 1 | 2 | 0 | 1 | 1 | 1 |
| 1099 | MEDIA 0002 | 0 | 1 | 0 | 0 | 1 | 1 | 0 |
| | ... | ... | ... | ... | ... | ... | ... | ... |

FIG. 10C

METHODS AND APPARATUS TO MEASURE EXPOSURE TO STREAMING MEDIA

CROSS-REFERENCE TO RELATED APPLICATIONS

This application is a continuation of U.S. patent application Ser. No. 18/158,335, filed Jan. 1, 2023, which is a continuation of U.S. patent application Ser. No. 17/456,538, filed Nov. 24, 2021, and issued as U.S. Pat. No. 11,563,994, which is a continuation of U.S. patent application Ser. No. 16/902,065, filed on Jun. 15, 2020, and issued as U.S. Pat. No. 11,197,046, which is a continuation of U.S. patent application Ser. No. 16/436,476, filed on Jun. 10, 2019, and issued as U.S. Pat. No. 10,687,100, which is a continuation of U.S. patent application Ser. No. 15/299,884, filed on Oct. 21, 2026, and issued as U.S. Pat. No. 10,356,455, which is a continuation of U.S. patent application Ser. No. 15/082,991, filed on Mar. 28, 2016, and issued as U.S. Pat. No. 9,503,784, which is a continuation of U.S. patent application Ser. No. 14/144,352, filed on Dec. 30, 2013 and issued as U.S. Pat. No. 9,332,035, which claims the benefit of U.S. Provisional Patent Application No. 61/889,505, filed on Oct. 10, 2013, and of U.S. Provisional Patent Application No. 61/890,176, filed on Oct. 11, 2013. Priority to U.S. patent application Ser. Nos. 18/158,335; 17/456,538; 16/902,065; 16/436,476; 15/299,884; 15/082,991; 14/144,352; 61/889,505; and 61/890,176 is hereby claimed. U.S. patent application Ser. Nos. 18/158,335; 17/456,538; 16/902,065; 16/436,476; 15/299,884; 15/082,991; 14/144,352; 61/889,505; and 61/890,176 are hereby incorporated herein by reference in their entireties.

FIELD OF THE DISCLOSURE

This disclosure relates generally to measuring media exposure, and, more particularly, to methods and apparatus to measure exposure to streaming media.

BACKGROUND

In recent years, media devices have been provided with Internet connectivity and the ability to retrieve media from the Internet. As such, media exposure has shifted away from conventional methods of presentation, such as broadcast television, towards presentation via consumer devices accessing the Internet to retrieve media for display.

Media providers and/or other entities such as, for example, advertising companies, broadcast networks, etc. are often interested in the viewing, listening, and/or media behavior of audience members and/or the public in general. The media usage and/or exposure habits of audience members as well as demographic data about the audience members is collected and used to statistically determine the size and demographics of an audience of interest.

Traditionally, audience measurement entities determine audience engagement levels for media programming and/or advertisements based on registered panel members. That is, an audience measurement entity enrolls people who consent to being monitored into a panel. The audience measurement entity then monitors those panel members to determine media (e.g., television programs, radio programs, movies, DVDs, etc.) presented to those panel members. In this manner, the audience measurement entity can determine exposure measures for different media (e.g., content and/or advertisements) based on the collected media measurement data.

BRIEF DESCRIPTION OF THE DRAWINGS

FIG. 10A is a table representative of impression data recorded by the example database proprietor.

FIG. 10B is a table representative of demographic information stored by the database proprietor.

FIG. 10C is a table representative of aggregated media presentation information as transmitted to the central facility by the database proprietor.

Wherever possible, the same reference numbers will be used throughout the drawing(s) and accompanying written description to refer to the same or like parts.

DETAILED DESCRIPTION

Figure 1:
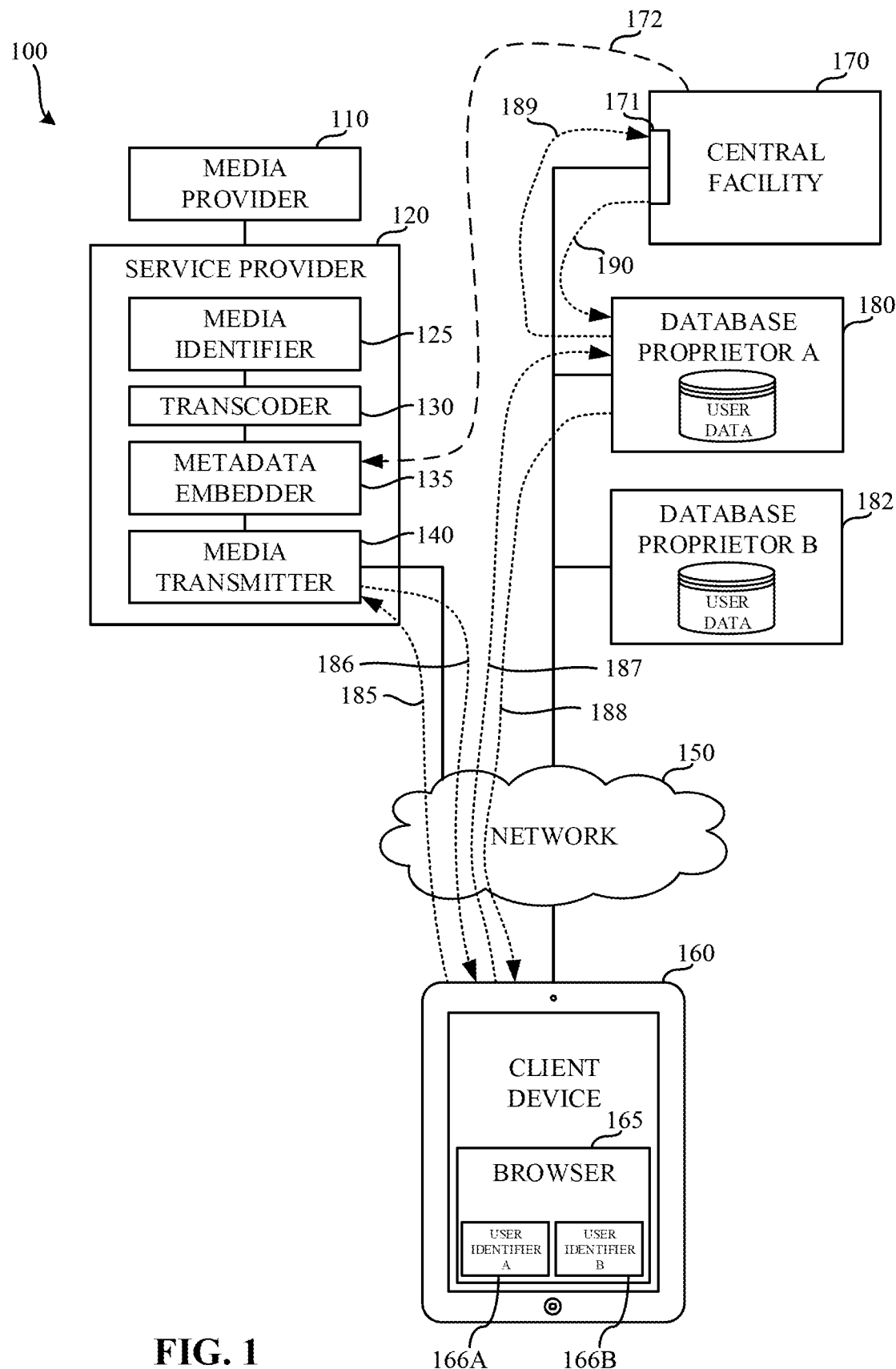
FIG. 1 depicts an example system that may be used to determine exposure to streaming media.

Monitoring companies desire to gain knowledge on how users interact with media devices such as smartphones, tablets, laptops, smart televisions, etc. In particular, the media monitoring companies want to monitor media presentations made at the media devices to, among other things, monitor exposure to advertisements, determine advertisement effectiveness, determine user behavior, identify purchasing behavior associated with various demographics, determine popularity ratings for content, etc. Monitoring companies enlist panelists and collect demographic information about the panelists. Media presentation information is then collected in association with the panelists. However, it is difficult for monitoring companies to collect detailed demographic information from every user to whom media is presented (e.g., non-panelists). In examples disclosed herein, monitoring companies cooperate with database proprietors (e.g., Facebook, Twitter, Experian, etc.) that have large databases of demographic information to extend media monitoring capabilities to non-panelists.

In examples disclosed herein, the presented media is identified using transcoded watermarks. The transcoded watermarks are transmitted as metadata (e.g., an ID3 tag) that is sent in association with and/or as part of the media. The media presentation device (e.g., an iPad, a smart TV, etc.) extracts the metadata and transmits the metadata to the database proprietor along with information that identifies the media device and/or a user of the media device to the database proprietor. If the database proprietor cannot identify the media device and/or a user of the media device, the database proprietor redirects the media device to a different database proprietor and/or the audience measurement entity, so that the media device and/or a user of the media device can be identified. If the database proprietor can identify the media device and/or a user of the media device, the database proprietor reports demographic information associated with the media device and/or user of the media device to the audience measurement entity for association with the media and/or the metadata identifying the media. In some examples, the metadata is not transmitted to the database proprietor to prevent the database proprietor from identifying the media accessed by the media device and/or the user.

Traditionally, audience measurement entities (also referred to herein as "ratings entities") determine demographic reach for advertising and/or media programming based on registered panel members. That is, an audience measurement entity enrolls people that consent to being monitored into a panel. During enrollment, the audience measurement entity receives demographic information from the enrolling people so that subsequent correlations may be made between media exposure to those panelists and different demographic markets. The audience measurement entity then sets and/or retrieves a user and/or device identifier so that subsequent impressions related to the panelist can be associated with the panelist and/or the demographics of the panelist. In some examples, the user and/or device identifier is cookie data or another identifier that is used by a media device (e.g., an iPad) when communicating with the audience measurement entity. Based on the user and/or device identifier, the audience measurement entity identifies demographic information provided by the panelist. In exchange for providing detailed demographic information, panelists are sometimes provided with incentives (e.g., apps, gift cards, cash, entry into a raffle and/or drawing, etc.). Accordingly, having a large panel can sometimes become cost prohibitive.

To alleviate the costs of constructing and/or maintaining a large panel, the audience measurement entity cooperates with other entities to obtain demographic information associated with media presentations. Example methods, apparatus, and/or articles of manufacture disclosed herein enable an audience measurement entity to request demographic information from other entities that operate based on user registration models. Cooperation with other entities that operate based on user registration models enables the audience measurement entity to effectively increase the size of the panel of users.

As used herein, a user registration model is a model in which users subscribe to services of those entities by creating an account and providing demographic-related information about themselves. Sharing of demographic information associated with registered users of database proprietors enables an audience measurement entity to receive audience measurement information from external sources (e.g., database proprietors), thus extending the coverage, accuracy, and/or completeness of their demographics-based audience measurements. Such access also enables the audience measurement entity to monitor persons who would not otherwise have joined an audience measurement panel.

Any entity having a database identifying demographics of a set of individuals may cooperate with the audience measurement entity. Such entities may be referred to as "database proprietors" and include entities such as wireless service carriers, mobile software/service providers, social networking sites (e.g., Facebook, Twitter, LinkedIn, Google, etc.), online retailer sites (e.g., Amazon.com, Buy.com, etc.), and/or any other Internet site that maintains user registration records (e.g., Yahoo!, MSN, Apple iTunes, Experian, etc.) There are many database proprietors operating on the Internet. Database proprietors provide services to large numbers of subscribers. In exchange for the provision of the service, the subscribers register with the proprietor. As part of this registration, the subscribers provide detailed demographic information. The database proprietors, as part of the use of the provided service (e.g., a social networking service, a shopping service, a news service, etc.) have access to set and/or collect cookies and/or other identifiers stored by a browser.

The database proprietor(s) report media presentation information and demographic information associated with the media presentation to the audience measurement entity. In traditional panelist-based systems, the panelist is aware that they are sharing demographic information with the audience measurement entity. However, in examples disclosed herein, demographic information is retrieved from a database proprietor and, accordingly, comes with data privacy concerns (because users may be unaware of the sharing of their demographic information). To that end, users may approve or prevent the sharing of demographic information on the part of the database proprietor. For example, when creating an account with the database proprietor(s), a user may be asked for their permission to share demographic information with other entities (e.g., the audience measurement entity).

In further contrast to demographic information received when enrolling panelists (where the panelist is requested to provide very detailed demographic information to the audience measurement entity), the demographic information collected by the database proprietor may not be as detailed as demographic information that would otherwise be collected by the audience measurement entity. For example, the database proprietor might not request demographic information related to the user's income, the user's interests, the user's race, etc. Furthermore, different database proprietors may request and/or store different information from the user. For example, a social media database proprietor may store demographic information related to user's race, interests, location, etc. while a credit reporting database proprietor may store demographic information related to a user's financial information (e.g., income, credit score, etc.).

In examples disclosed herein, database proprietors provide demographic information concerning users to the audience measurement entity (e.g., The Nielsen Company of Schaumburg, Illinois, United States of America) in association with particular pieces of media. The demographic information, in some examples, is provided in the aggregate. In some examples, a database proprietor transmits demographic information on an aggregate basis when a threshold number of users to whom a particular piece of media was presented is reached. For example, aggregated demographic information may be provided only when there are more than one hundred users associated with the media. However, any other threshold amount of users may additionally or alternatively be used. In contrast, demographic information may be provided to the ratings entity on an individual basis when a single user is identified in association with the demographic information. Whether to provide the demographic information to the ratings entity in the aggregate or individually may be determined by the database proprietor for any reason such as, for example, privacy laws in the jurisdiction of the database proprietor, business factors, technical limitations, etc.

In some examples, to more accurately associate media presentations with the correct demographics, example methods, apparatus, and/or articles of manufacture disclosed herein leverage user information located in the audience measurement entity's records (e.g., panelist information) as well as user information located at one or more database proprietors (e.g., web service providers) that maintain records or profiles of users having accounts therewith. In some examples, multiple database proprietors may report demographic information to the media monitoring entity in association with the same media. Multiple sources (e.g., demographic information from the panels of an audience measurement company and/or registered user data of web service providers) may be useful because the additional data results in improved accuracy of demographic metrics for content and/or advertising campaigns. Example techniques disclosed herein use online registration data to identify demographics of users to track quantities of impressions attributable to demographics associated with those users. As used herein, an impression refers to an exposure to media (e.g., content and/or an advertisement). In Internet advertising, a quantity of impressions or impression count is the total number of times an advertisement or advertisement campaign has been accessed by a population. Impressions do not take into account multiple exposures to the same individual (i.e., two exposures to the same person count as two impressions). In contrast, unique impression counts eliminate duplicate exposures and, thus, only count one exposure per person irrespective of how many times that person may actually experience an exposure.

As used herein, the term "media" includes any type of content and/or advertisement delivered via any type of distribution medium. Thus, media includes television programming or television advertisements, radio programming or radio advertisements, movies, web sites, streaming media, etc. Example methods, apparatus, and articles of manufacture disclosed herein monitor media presentations at media devices. Such media devices may include, for example, Internet-enabled televisions, personal computers, Internet-enabled mobile handsets (e.g., a smartphone such as an Apple iPhone®, a Samsung Galaxy S® 4, etc.), video game consoles (e.g., Xbox®, PlayStation® 3), tablet computers (e.g., an iPad®), digital media players (e.g., AppleTV®, a Roku® media player, a Slingbox®, etc.), etc. In some examples, media monitoring information is aggregated to determine ownership and/or usage statistics of media devices, relative rankings of usage and/or ownership of media devices, types of uses of media devices (e.g., whether a device is used for browsing the Internet, streaming media from the Internet, etc.), and/or other types of media device information. In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or device and/or user-identifying information (e.g., a username, a media access control (MAC) address, an Internet Protocol (IP) address, an Apple ID, a panelist identifier, a Google ID, any other type of identifier, etc.).

Media devices such as tablet computers (e.g., an Apple iPad®, an Asus Transformer™, etc.) present media using apps and/or browsers that access, retrieve, request, and/or present media (e.g., Internet media). Many different browsers exist such as, for example, Google Chrome®, Mozilla Firefox, Apple Safari®, Dolphin, etc. Apps and/or browser(s) can be downloaded by users through app stores such as, for example, Apple iTunes®, Google Play®, etc.

Operating systems of the media devices and/or browsers operated by the media devices are often closed platforms. That is, the operating systems and/or browsers provide a limited set of functions that can be accessed. In some examples, browsers have access to a limited set of functionality for sharing data outside of the media device. For example, browsers may have access to a limited set of user information (e.g., cookies), and/or may not allow programmatic access to audio and/or video of media presented by the device. Cookies can be used to store information related to a user of the media device in association with an accessed domain (e.g., Facebook.com, twitter.com, Nielsen.com, etc.). For example, a username may be stored in association with a particular domain, display settings may be stored in association with the domain, etc. Traditionally, cookies are of limited use for identifying users across domains. For example, browsers are only permitted to transmit cookies when accessing a site having a domain name matching the cookies. For example, browsers are not allowed to transmit cookies associated with the domain "xyz.com" when accessing the domain "abc.com."

While cookies and/or other identifiers can be used to identify the media device and/or a user of the media device to the audience measurement entity and/or the database proprietor, it is equally important to properly identify the media presented via the media device. Media is traditionally identified using codes, signatures, watermarks, etc. embedded in audio and/or video of the media. However, identification of an audio and/or video watermark at media devices presents difficulties. For example, some media devices do not allow programmatic access to the audio and/or video of the media, processing audio and/or video watermarks may quickly drain a battery of the media device, etc. Examples disclosed herein address this problem through transcoding. In some such examples, a service provider (e.g., a streaming media provider) transcodes the watermark into a format which is readily ascertainable by the media device.

In some examples, media-identifying metadata having a first format is extracted from the presented media. The media-identifying metadata may indicate, for example, a watermark associated with the media, a universal resource locator (URL) (e.g., a URL of a database proprietor, etc.) indicating where to transmit a notification of the media presentation. In some such examples, the transport stream corresponds to a Moving Picture Experts Group (MPEG) 2 transport stream sent according to a hypertext transfer protocol (HTTP) live streaming (HLS) protocol. In some examples, the watermark is an audio watermark that is embedded in an audio portion of the media using a first metadata format. In some examples, the watermark having the first format is transcoded into media-identifying metadata having a second format. The media-identifying metadata having the second format may correspond to, for example, a textual representation of the watermark, such as a base-64 hexadecimal string of characters. In some examples, the media-identifying metadata is transmitted in a metadata transport stream associated with the media.

In some disclosed examples, streaming media is delivered to the media device using HTTP Live Streaming (HLS). However, any other past, present, and/or future method of streaming media to the media device may additionally or alternatively be used such as, for example, an HTTP Secure (HTTPS) protocol. HLS transport streams allow metadata to be included in and/or associated with, for example, a media stream, a timed text track, etc. In some disclosed examples, a media device uses a browser to display media received via HLS. Additionally or alternatively, in some disclosed examples the media device uses a media presenter (e.g., a browser plugin, an app, a framework, an application programming interface (API), etc.) to display media received via HLS.

Some example methods disclosed herein include decoding the HLS transport stream carrying the media-identifying metadata streamed to a media device to obtain the media. Some such example methods also include extracting metering data from the media and/or receiving metering data from an independent metering data source (e.g., a timed text track file sent in association with the media, a manifest file, etc.). In some examples, in addition to identifying the media, the media-identifying metadata may additionally or alternatively identify a source of the media. Additionally, some such example methods further include decoding media-identifying metadata (e.g., such as electronic guide (EPG) data, playlist data, etc.) already accompanying the transport stream carrying the media. Some such example methods further include verifying the media identifying metadata using the metering data (e.g., the transcoded watermark) extracted from the media.

In examples disclosed herein, media exposure metrics are monitored by retrieving metadata embedded in or otherwise transported with the media presented via a media presenter of the media device. In some examples, the metadata is stored in a Document Object Model (DOM) object. The DOM is a cross-platform and language-independent convention for representing and interacting with objects in Hypertext Markup Language (HTML). In some examples, media presenters (e.g., media plugins) such as, for example, the QuickTime player, emit DOM events that can be captured via JavaScript. By capturing the DOM events triggered by the media presenter, it is possible to extract metadata via the DOM. Once extracted, the metadata may be combined with other information such as, for example, cookie or other user identifying data associated with the user of the device, and transmitted to, for example, a database proprietor, and/or the audience measurement entity for analysis and/or computation with data collected from other devices.

In some examples, the metadata is stored in an ID3 tag format, although any other past, present, and/or future metadata format may additionally or alternatively used. An ID3 tag is a metadata container that may be appended to and/or transmitted in association with media. In the examples disclosed herein, an ID3v2 format is used. In particular, the media-identifying metadata is stored in a private frame of the ID3 tag. However, any other past, present, or future way of storing media-identifying metadata may additionally or alternatively be used.

In examples disclosed herein, a software development kit (SDK) is provided to website developers from, for example, an audience measurement entity or other entity. The SDK facilitates instrumenting and/or otherwise enabling websites (e.g., media websites (such as streaming video websites), news websites, image websites, social media websites, online gaming websites, etc.) with monitoring functionalities which collect and transmit monitoring information (e.g., a cookie and/or other user or device identifier, a media identifier (the ID3 tag), etc.) to a database proprietor and/or the audience measurement entity. In particular, the website developers create websites that include media monitoring instructions using the SDK. Accordingly, rather than relying on a dedicated monitoring application installed on a computer (e.g., a tablet, a laptop, a smartphone, etc.), websites disclosed herein are instrumented with monitoring instructions such that the browser transmits monitoring information to the database proprietor and/or the monitoring entities (e.g., the audience measurement entity). In some examples, monitoring instructions provided by the SDK are implemented using JavaScript instructions. However, any other language or type of script or instructions may additionally or alternatively be used. The monitoring instructions enable the browser to notify the database proprietor and/or the monitoring entities (e.g., the audience measurement entity) when a website and/or media associated with the website is presented, notify the database proprietor and/or the monitoring entities (e.g., the audience measurement entity) what media and/or website(s) are presented, notify the database proprietor and/or the monitoring entities (e.g., the audience measurement entity) how the website and/or media is being presented (e.g. via a tablet display, via a television, etc.), notify the database proprietor and/or the monitoring entities (e.g., the audience measurement entity) of a duration of exposure of a website and/or media associated with the website, etc. In some examples, the media monitoring instructions may be triggered by, for example presentation of a media element such as, for example, a video, audio, an image, etc.

Example methods, apparatus and/or articles of manufacture disclosed herein enable reporting of media impressions and corresponding demographics from the database proprietor to the ratings entity, also referred to herein as an audience measurement entity (AME.) In this manner, the AME can track media impressions on media devices, and/or create reports of media impressions broken down by different demographic statistics.

Example methods, apparatus, and articles of manufacture disclosed herein can be used to determine media impressions, content impressions, advertisement impressions, content exposure, and/or advertisement exposure using user information, which is distributed across different databases (e.g., different website owners, service providers, etc.) on the Internet. Not only do example methods, apparatus, and articles of manufacture disclosed herein enable more accurate correlation of Internet media exposure to user (e.g., demographics) information, but they also effectively extend panel sizes and compositions beyond persons participating in the panel of a monitoring entity (e.g., an audience measurement entity and/or a ratings entity) to persons registered in Internet databases such as the databases of wireless service carriers, mobile software/service providers, social medium sites (e.g., Facebook, Twitter, Google, etc.), and/or any other Internet sites such as Yahoo!, MSN, Apple iTunes, Experian, etc. This extension effectively leverages the media exposure tracking capabilities of a monitoring entity (e.g., the audience measurement entity) and the databases of non-AME entities such as social media and/or other websites to create an enormous, demographically accurate panel that results in accurate, reliable measurements of exposures to media such as advertising and/or content (e.g., programming).

FIG. 1 is a diagram of an example system 100 constructed in accordance with the teachings of this disclosure for measuring exposure to streaming media. The example system 100 of FIG. 1 monitors media provided by an example media provider 110 for presentation on an example client device 160 via an example network 150. The example system 100 includes an example service provider 120, an example browser 165, a first database proprietor 180, a second database proprietor 182, and an example central facility 170 of an audience measurement entity. While the illustrated example of FIG. 1 discloses an example implementation of the service provider 120, other example implementations of the service provider 120 may additionally or alternatively be used, such as the example implementations disclosed in U.S. patent application Ser. No. 13/341,646, U.S. patent application Ser. No. 13/443,596, U.S. patent application Ser. No. 13/793,991, U.S. patent application Ser. No. 13/445,961, U.S. patent application Ser. No. 13/472,170, U.S. patent application Ser. No. 13/793,983, U.S. patent application Ser. No. 13/767,548, U.S. patent application Ser. No. 13/793,959, U.S. patent application Ser. No. 13/778,108, U.S. patent application Ser. No. 61/813,019, and/or U.S. patent application Ser. No. 13/963,737, which are hereby incorporated by reference herein in their entirety.

The example media provider 110 of the illustrated example of FIG. 1 represents any one or more media provider(s) capable of providing media for presentation at the client device 160. The media provided by the media provider(s) 110 can be any type of media, such as audio, video, multimedia, webpages, etc. Additionally, the media can correspond to live (e.g., broadcast) media, stored media (e.g., on-demand content), etc.

The service provider 120 of the illustrated example of FIG. 1 provides media services to the client device 160 via, for example, web pages including links (e.g., hyperlinks, embedded media, etc.) to media provided by the media provider 110. In the illustrated example, the service provider 120 modifies the media provided by the media provider 110 prior to transmitting the media to the client device 160. In the illustrated example, the service provider 120 includes an example media identifier 125, an example transcoder 130, an example metadata embedder 135, and an example media transmitter 140.

The media identifier 125 of the illustrated example of FIG. 1 is implemented by a logic circuit such as a processor executing instructions, but it could additionally or alternatively be implemented by an application specific integrated circuit(s) (ASIC(s)), programmable logic device(s) (PLD(s)) and/or field programmable logic device(s) (FPLD(s)), an analog circuit, and/or other circuitry. The media identifier 125 of FIG. 1 extracts metering data (e.g., signatures, watermarks, etc.) from the media obtained from the media provider 110. For example, the media identifier 125 can implement functionality provided by a software development kit (SDK) to extract one or more audio watermarks, one or more video (e.g., image) watermarks, etc., embedded in the audio and/or video of the media obtained from the media provider 110. (For example, the media may include pulse code modulation (PCM) audio data or other types of audio data, uncompressed video/image data, etc.)

The example media identifier 125 of FIG. 1 determines (e.g., derives, decodes, converts, etc.) the metering data (e.g., media identifying information, source identifying information, etc.) included in or identified by a watermark embedded in the media and converts this metering data and/or the watermark itself into a text and/or binary format for inclusion in an ID3 tag and/or other data type (e.g., text, binary, etc.) for transmission as metadata (e.g., such as with a playlist or electronic program guide) accompanying the streaming media. For example, the code/watermark itself may be extracted and inserted as metadata in, for example, a text or binary format in the ID3 tag. Thus, the metadata and/or media-identifying metadata included in the ID3 tag may be a text or binary representation of a code, a watermark, and/or metadata or data identified by a code and/or watermark, etc. Additionally or alternatively, the watermark may be used to retrieve metering data from a local or remote database. In some examples, the media-identifying metadata is stored in a private frame of the ID3 tag. In some other examples, the ID3 tag includes a location of a database proprietor to which the monitoring information should be sent.

The example transcoder 130 of the illustrated example of FIG. 1 is implemented by a logic circuit such as a processor executing instructions, but could additionally or alternatively be implemented by an analog circuit, ASIC, DSP, FPGA, and/or other circuitry. In some examples, the transcoder 130 and the media identifier 125 are implemented by the same physical processor. In the illustrated example, the transcoder 130 employs any appropriate technique(s) to transcode and/or otherwise process the received media into a form suitable for streaming (e.g., a streaming format). For example, the transcoder 130 of the illustrated example transcodes the media in accordance with MPEG 4 audio/video compression for use with the HLS protocol.

The metadata embedder 135 of the illustrated example of FIG. 1 is implemented by a logic circuit such as a processor executing instructions, but could additionally and/or alternatively be implemented by an analog circuit, ASIC, DSP, FPGA, and/or other circuitry. In some examples, the transcoder 130, the media identifier 125, and the metadata embedder 135 are implemented by the same physical processor.

In the illustrated example, the metadata embedder 135 embeds the metadata determined by the media identifier 125 into the transport stream(s) carrying the streaming media. In the illustrated example, the metadata embedder 135 embeds the metadata into an internal metadata channel, such as by encoding metadata that is in a binary and/or other appropriate data format into one or more data fields of the transport stream(s) that is(are) capable of carrying metadata. For example, the metadata embedder 135 can insert ID3 tag metadata corresponding to the metering metadata into the transport stream(s) that is (are) to stream the media in accordance with the HLS or other appropriate streaming protocol. Additionally or alternatively, the metadata embedder 135 may embed the metadata into an external metadata channel, such as by encoding the metadata into an M3U8 or other data file that is to be associated with (e.g., included in, appended to, sent prior to, etc.) the transport stream(s) that are to provide the streaming media to the client device 160.

The media transmitter 140 of the illustrated example of FIG. 1 is implemented by a logic circuit such as a processor executing instructions, but could additionally or alternatively be implemented by an analog circuit, ASIC, DSP, FPGA, and/or other circuitry. In some examples, the transcoder 130, the media identifier 125, the metadata embedder 135, and the media transmitter 140 are implemented by the same physical processor.

The media transmitter 140 of the illustrated example employs any appropriate technique(s) to select and/or stream the media to a requesting device, such as the client device 160. For example, the media transmitter 140 of the illustrated example selects media that has been identified by the media identifier 125, transcoded by the transcoder 130 and undergone metadata embedding by the metadata embedder 135. The media transmitter 140 then streams the media to the client device 160 via the network 150 using HLS or any other streaming protocol.

In some examples, the media identifier 125, the transcoder 130, and/or the metadata embedder 130 prepare media for streaming regardless of whether (e.g., prior to) a request is received from the client device 160. In such examples, the already-prepared media is stored in a data store of the service provider 120 (e.g., such as in a flash memory, magnetic media, optical media, etc.). In such examples, the media transmitter 140 prepares a transport stream for streaming the already-prepared media to the client device 160 when a request is received from the client device 160. In other examples, the media identifier 125, the transcoder 130, and/or the metadata embedder 130 prepare the media for streaming in response to a request received from the client device 160.

The example network 150 of the illustrated example is the Internet. Additionally or alternatively, any other network(s) communicatively linking the service provider 120 and the client device such as, for example, a private network, a local area network (LAN), a virtual private network (VPN), etc. may be used. The network 150 may comprise any number of public and/or private networks using any type(s) of networking protocol(s).

The client device 160 of the illustrated example of FIG. 1 is a computing device that is capable of presenting streaming media provided by the media transmitter 140 via the network 150. The example client device 160 of the illustrated example is capable of directly presenting media (e.g., via a display) while, in other examples, the client device 160 presents the media on separate media presentation equipment (e.g., speakers, a display, etc.). Thus, as used herein a "client device" may or may not be able to present media without assistance from a second device. Client devices are typically consumer electronics devices. For example, the client device 160 of the illustrated example is a tablet such as an Apple iPad®, and thus, is capable of directly presenting media (e.g., via an integrated display and speakers). While in the illustrated example, a tablet is shown, any other type(s) and/or number(s) of client device(s) may additionally or alternatively be used. For example, Internet-enabled mobile handsets (e.g., a smartphone, an iPod®, etc.), video game consoles (e.g., any generation of Xbox®, PlayStation®, etc.), tablet computers (e.g., an iPad®, a Motorola™ Xoom™, etc.), digital media players (e.g., a Roku® media player, a Slingbox®, a Tivo®, etc.), smart televisions, etc. may additionally or alternatively be used.

Client devices such as the client device 160 of FIG. 1 traditionally include a browser 165 for displaying media. A browser is an application for retrieving and displaying websites and media associated therewith. When retrieving and displaying websites, the browser 165 may execute scripts such as, for example, JavaScript. The scripts are provided as part of, and/or are referenced by, the website. In some examples, the scripts executed by the browser 165 cause the browser to store information in association with the domain of the website. For example, the scripts can cause the browser 165 to store information as a cookie. In some such examples, every time that the browser retrieves the website, the cookie is sent to the location from which the website is requested. However, only cookies associated with a domain of the requested website are transmitted. For example, cookies for the domain "xyz.com" are not transmitted when requesting "abc.com." Sometimes, when requesting an Internet resource at a first location (e.g., a URL), the browser may receive a response from a server at the first location that the browser should re-direct the request to a second location. In examples disclosed herein, the response is implemented using a Hypertext Transfer Protocol (HTTP) redirect message. However, any other way of redirecting a browser to a second location may additionally or alternatively be used.

The example database proprietor 180, 182 of the illustrated example of FIG. 1 are implemented by a server hosted by an entity having a database identifying demographics of a set of individuals. The server cooperates with the audience measurement entity to collect and return media presentation information and demographic information associated therewith. The example database proprietor 180, 182 includes entities such as wireless service carriers, mobile software/service providers, social networking sites (e.g., Facebook, Twitter, LinkedIn, Google, etc.), online retailer sites (e.g., Amazon.com, Buy.com, etc.), and/or any other Internet site that maintains user registration records (e.g., Yahoo!, MSN, Apple iTunes, Experian, etc.) While in the illustrated example of FIG. 1 there are two database proprietors, there may be any number of database proprietors. The database proprietors 180, 182 provide services to large numbers of users. In exchange for the provision of the service, the users register with the proprietor. As part of this registration, the users provide detailed demographic information such as, for example, their home mailing address, their credit score, their race and/or ethnicity, their age, their yearly income, etc. The database proprietors, as part of the use of the provided service (e.g., a social networking service, a shopping service, a news service, etc.) have access to set and/or collect cookies stored by a browser accessing their domain (e.g., the Facebook.com domain) and, therefore, can identify users of the service when the user transmits a request to the database proprietor 180, 182 by retrieving the cookies from the user device. Although this example speaks of cookies, any other type of user identifier may be employed.

The central facility 170 of the audience measurement entity of the illustrated example of FIG. 1 includes an interface to receive reported metering information (e.g., metadata) from the browser 165 of the client device 160 and/or the database proprietor 180, 182, via the network 150. In the illustrated example, the central facility 170 includes an HTTP interface to receive HTTP requests that include the metering information. Additionally or alternatively, any other method(s) to receive metering information may be used such as, for example, an HTTP Secure protocol (HTTPS), a file transfer protocol (FTP), a secure file transfer protocol (SFTP), etc.

In the illustrated example, the central facility 170 instructs the metadata embedder 135 and/or, more generally, the service provider 120 to embed a tag in media to be streamed. In the illustrated example, the tag is formatted as an ID3 tag. For example, the tag may be formatted as a JavaScript instruction. However, any other format of tag and/or instructions may additionally or alternatively be used. In some examples, the metadata embedder 135 is provided to the service provider 120 by the audience measurement entity.

In the illustrated example, the central facility 170 stores and analyzes metering information received from a plurality of different client devices and/or from the database proprietor(s) 180, 182. For example, the central facility 170 may sort and/or group metering information by media provider 110 (e.g., by grouping all metering data associated with a particular media provider 110). Any other processing of metering information may additionally or alternatively be performed. In the illustrated example, the central facility 170 is associated with an audience measurement company and is not involved with the delivery of media to the client device.

Although the following examples refer to an audience measurement entity, any monitoring entity may fill this role. FIG. 1 is a block diagram of an example system constructed in accordance with the teachings of this disclosure to monitor media presentations. In the illustrated example of FIG. 1, to track media impressions on a client device 160, an audience measurement entity (AME) partners with or cooperates with the service provider to create a website that includes monitoring instructions. In the illustrated example, the AME provides a software development kit (SDK) to the service provider 120. The SDK of the example of FIG. 1 is a set of development tools (e.g., libraries (e.g., dynamically linked libraries (DLLs)), application programming interfaces (APIs), instructions, JavaScript files, etc.) that enable the service provider 120 to integrate monitoring instructions into the website transmitted to the client device 160. In examples disclosed herein, the monitoring instructions enable identification of media presented at the client device 160, as well as identification of the user device and/or demographics of the corresponding user via interaction with a database provider.

As disclosed herein, the media monitoring instructions include instructions (e.g., Java, JavaScript, or any other computer language or script) that, when executed by the browser 165 and/or, more generally, the client device 160, cause the client device 160 to collect and/or otherwise identify the media presented by the browser 165 and/or the client device 160, and to collect one or more user identifiers 166A, 166B (e.g., cookies). The user identifiers 166A, 166B of the illustrated example include identifiers that can be used by corresponding ones of the partner database proprietors 180, 182 to identify the user or users of the client device 160, and to locate user information corresponding to the user(s). For example, the user identifiers 166A, 166B may include hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), an open source unique device identifier (OpenUDID), an open device identification number (ODIN), a login identifier (e.g., a username), an email address, user agent data (e.g., application type, operating system, software vendor, software revision, etc.), third-party service identifiers (e.g., advertising service identifiers, device usage analytics service identifiers, demographics collection service identifiers), cookies, etc. In some examples, fewer or more user identifiers 166A, 166B may be used. The user identifiers 166A, 166B and the media identifying metadata are transmitted in a request to a database proprietor 180, 182. The request is referred to as a dummy request in that it is not actually requesting information (e.g., a webpage), but rather is a vehicle for conveying monitoring information (e.g., the user identifier(s) 166A, 166B, the media-identifying metadata, etc.). In addition, although only two database proprietors 180, 182 are shown in FIGS. 1 and/or 2, the AME may partner with any number (e.g., 1, 2, 3, 4, etc.) of partner database proprietors to collect distributed media monitoring information. In examples disclosed herein, the database proprietors 180, 182 collect and/or establish the user identifiers 166A, 166B when, for example, a user of the client device 160 uses a service provided by the database proprietor 180, 182.

In the illustrated example, the client device 160 requests media from the service provider 120 (line 185). The media may be an advertisement, video, audio, text, a graphic, a web page, news, educational media, entertainment media, or any other type of media. In the illustrated example, service provider 120 replies to the request with the media (line 186). The reply from the service provider 120 (e.g., the media) includes monitoring instructions that cause the browser to identify the media to, for example, a third party. The browser 165 then displays the media and identifies the media by accessing a media ID provided in and/or in association with the media. In examples disclosed herein, the media ID is an ID3 tag including media-identifying metadata, source-identifying metadata, a watermark, etc. At the direction of the monitoring instructions, the browser 165 then transmits a dummy request to the database proprietor 180 (line 187). In the illustrated example, a user identifier 166A (e.g., a cookie associated with the database proprietor 180) has previously been stored by the browser 165. The request to the database proprietor 180 (line 187) includes the user identifier 166A and the media identifier. In some examples, the media identifier is encrypted to prevent the database proprietor 180, 182 from identifying the media. The encrypted media identifier may later be decrypted by the central facility 170. The database proprietor 180 then determines that it can identify the user based on the user identifier 166A, stores a record of the media presentation, and sends an acknowledgement to the client device 160 (line 188). At a later time, the database proprietor 180 transmits the record of the media presentation to the central facility 170 (line 194) and, in return, receives an acknowledgement message (line 195). The record of the media presentation includes the media-identifying metadata (which may be encrypted). In some examples, the media identifying metadata of the record is formatted as an ID3 tag. Based on the received record, the central facility 170 and/or, more generally, the AME, may report on presentation metrics for different media.

Figure 2:
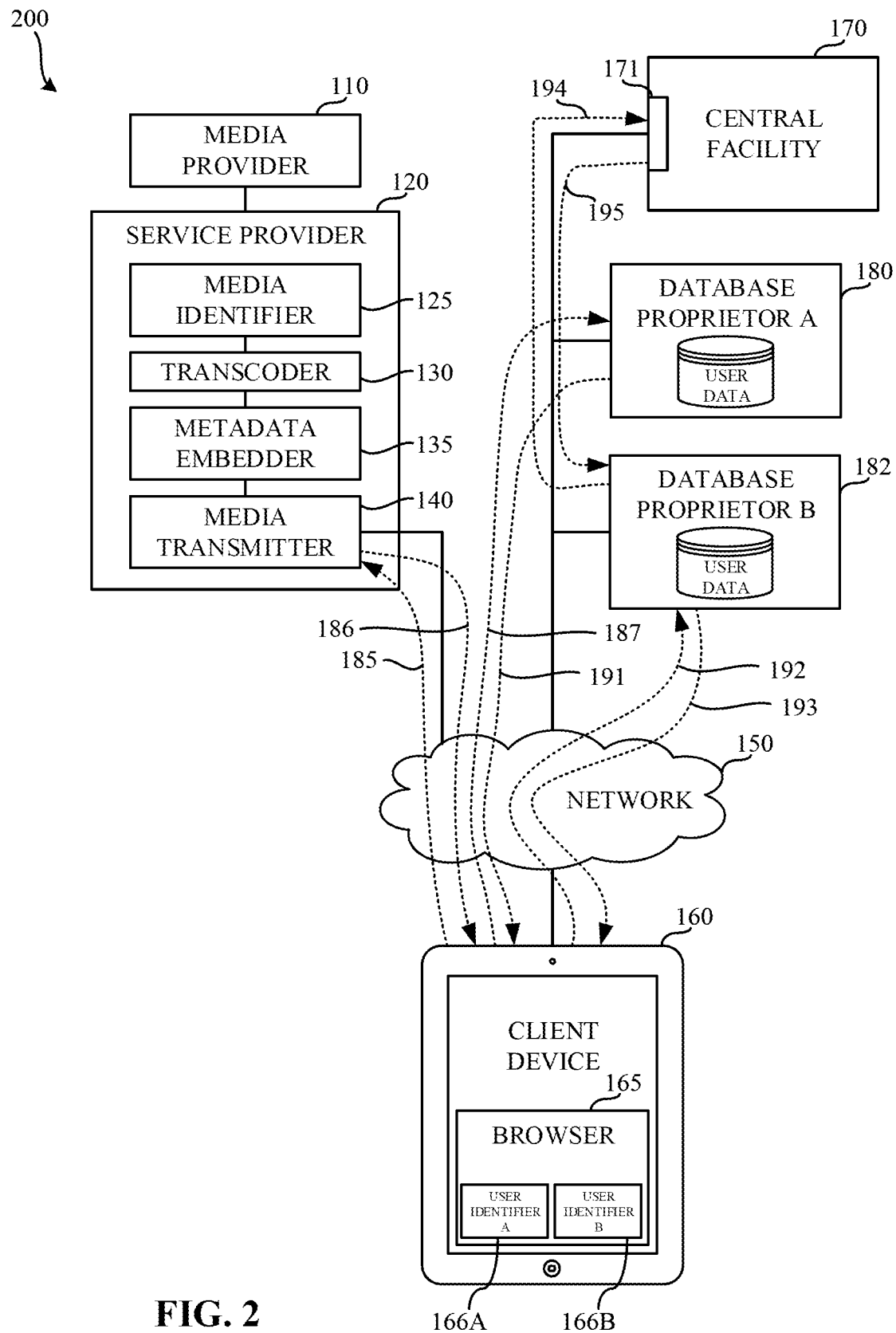
FIG. 2 depicts an alternative example system that may be used to determine exposure to streaming media.

FIG. 2 represents an alternative example system that may be used to determine exposure to streaming media. In the illustrated example of FIG. 2, the browser 165 and/or, more generally, the client device 160 requests media from the service provider 120 (line 185). The media is returned to the browser 165 (line 186). At the direction of the monitoring instructions, the browser then transmits a request and accompanying user identifier 166A to the first database proprietor 180 (line 187). In the illustrated example of FIG. 2, the database proprietor is not able to identify a user associated with the user identifier 166A (and/or no user identifier is included in the request). In response, the database proprietor 180 transmits an HTTP redirect message to the browser 165. The browser 165 follows the redirect message and transmits a request to the second database proprietor 182 identifying the media, along with the user identifier 166B stored in association with the second database proprietor 182. The second database proprietor inspects the user identifier 166B, stores the user identifier in association with the media identifier, and, being able to identify a user associated with the user identifier 166B, transmits an acknowledgement to the browser 165 (line 193). The second database proprietor 182 then transmits the media monitoring information and demographic information associated with the user to the central facility (line 194), and receives an acknowledgement from the central facility 170 (line 195).

Figure 2A:
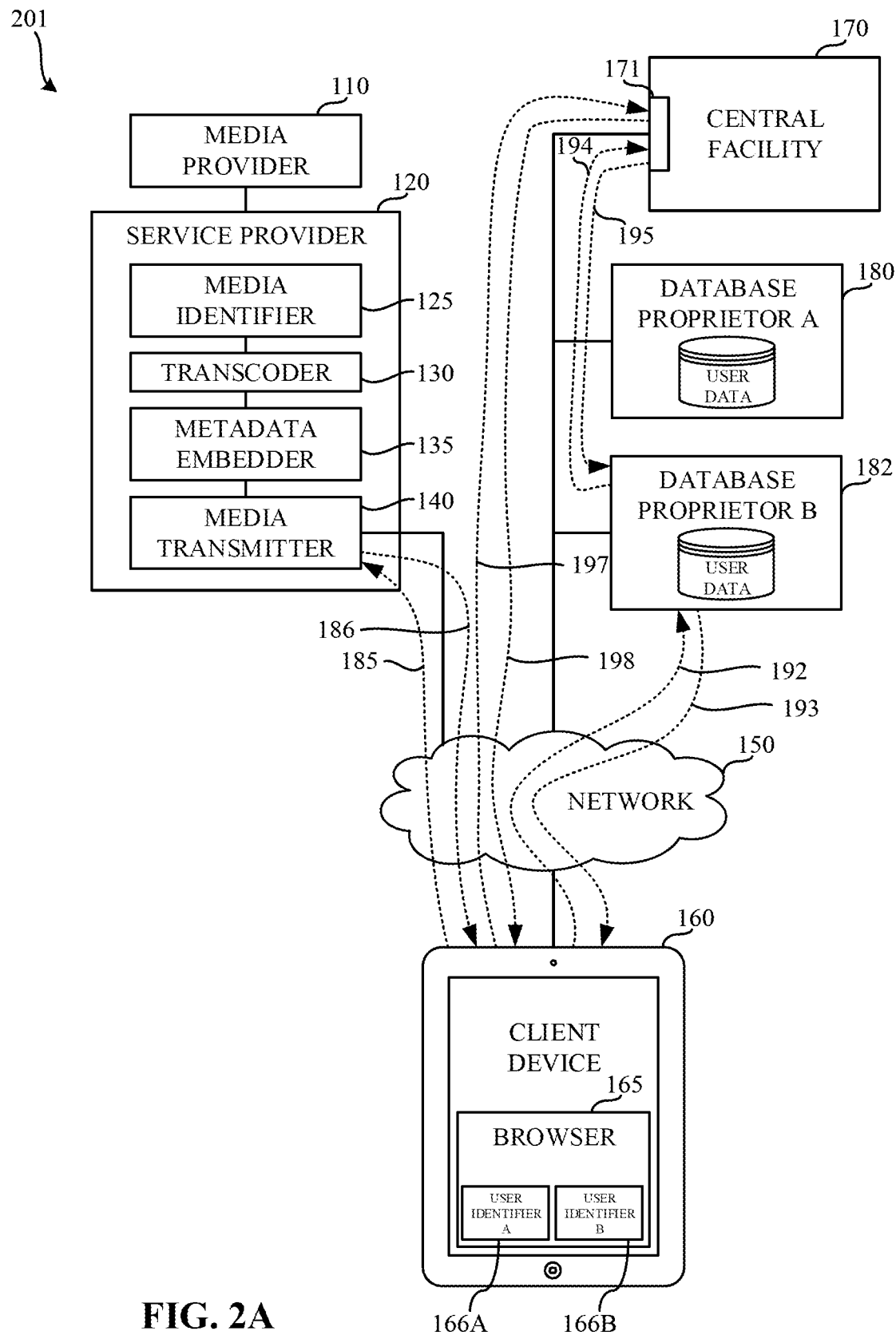
FIG. 2A depicts an alternative example system that may be used to determine exposure to streaming media.

FIG. 2A represents an alternative example system that may be used to determine exposure to streaming media. In the illustrated example of FIG. 2A, instead of transmitting a first dummy request to the database proprietor 180 (e.g., as shown by line 187 of FIG. 2), the first dummy request of FIG. 2A is transmitted to the central facility 170 (e.g., as shown by line 197 of FIG. 2A).

In the illustrated example of FIG. 2A, the first request the browser 165 and/or, more generally, the client device 160 requests media from the service provider 120 (line 185). The media is returned to the browser 165 (line 186). At the direction of the monitoring instructions (e.g., instructions located by or carried in an ID3 tag transmitted with the media), the browser then transmits a request and accompanying user identifier 166A to the central facility 170 (line 197). In the illustrated example of FIG. 2, the central facility 170 is not able to identify a user associated with the user identifier 166A (and/or no user identifier is included in the request). In response, the central facility 170 transmits an HTTP redirect message to the browser 165 (line 198).

Like the example database proprietor 180 of FIG. 2, the example central facility 170 of FIG. 2A receives dummy requests from the browser 165 and, in some examples, replies to the browser 165 with a redirection message. The browser 165 follows the redirect message and transmits a request to the database proprietor 182 identifying the media, along with the user identifier 166B stored in association with the database proprietor 182. The database proprietor inspects the user identifier 166B, stores the user identifier in association with the media identifier, and, being able to identify a user associated with the user identifier 166B, transmits an acknowledgement to the browser 165 (line 193). The database proprietor 182 then transmits the media monitoring information and demographic information associated with the user to the central facility 170 (line 194), and receives an acknowledgement from the central facility 170 (line 195).

While in the illustrated examples of FIGS. 1, 2, and/or 2A, only two database proprietors are shown, any number of database proprietors may additionally or alternatively be used. Furthermore, while a single database proprietor records the monitoring information in the illustrated example, multiple database proprietors may record such information. Recording the media-identifying information and/or demographic information associated with presentation of the media associated with the media-identifying information in multiple locations may increase the accuracy of the demographic information associated with the media presentation, may enable recordation of monitoring information that might not otherwise be recorded, etc.

Figure 3:
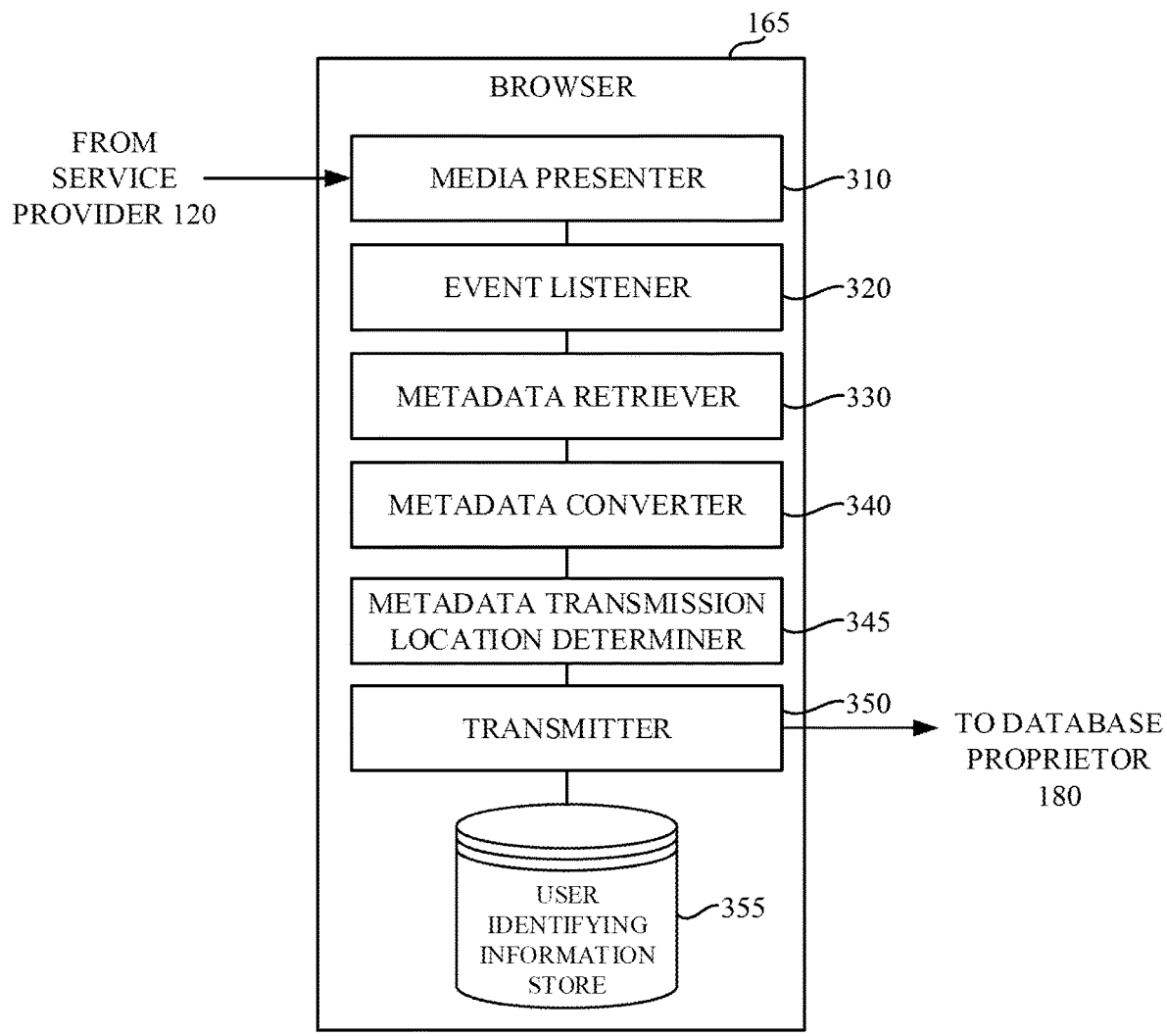
FIG. 3 is a block diagram of an example implementation of the browser of FIG. 1.

FIG. 3 is a block diagram of an example implementation of the browser 165 of FIG. 1. The browser 165 of the illustrated example of FIG. 3 includes an example media presenter 310, an example event listener 320, an example metadata retriever 330, an example metadata converter 340, an example metadata transmission location determiner 345, an example transmitter 350, and an example user identifying information store 355.

The media presenter 310 of the illustrated example of FIG. 3 is implemented by a processor executing instructions, but it could additionally or alternatively be implemented by an analog circuit, an ASIC, DSP, FPGA, and/or other circuitry. In the illustrated example, the media presenter 310 interacts with a QuickTime® application programming interface (API) to display media via the client device 160. While in the illustrated example, the QuickTime® API is used, any other media presenting framework may additionally or alternatively be employed. For example, the example media presenter 310 may interact with an Adobe® Flash® media presentation framework.

The example event listener 320 of the illustrated example of FIG. 3 is implemented by a logic circuit such as a processor executing instructions, but it could additionally or alternatively be implemented by an analog circuit, an ASIC, DSP, FPGA, and/or other circuitry. In some examples, the media presenter 310 and the event listener 320 are implemented by the same physical processor. In the illustrated example, the example event listener 320 interfaces with JavaScript functions to enable reception of and/or listening for an event notification. An event notification is any notification of activity within the browser and/or application. Event notifications may be triggered when, for example, a new webpage is loaded, media is presented, a user input is detected, etc. While JavaScript is used to listen for event notifications in the illustrated example, any other framework, such as, for example, ActiveX, Microsoft Silverlight, etc., may be used to listen for event notifications.

The metadata retriever 330 of the illustrated example of FIG. 3 is implemented by a logic circuit such as a processor executing instructions, but it could additionally or alternatively be implemented by an analog circuit, an ASIC, DSP, FPGA, and/or other circuitry. In some examples, the media presenter 310, the event listener 320, and the metadata retriever 330 are implemented by the same physical processor. In the illustrated example, the metadata retriever 330 retrieves metadata from the media presenter 310 upon detection of an event notification by the event listener 320. In the illustrated example, the metadata retriever 330 retrieves the metadata by inspecting a document object model (DOM) object of the media presenter 310 using JavaScript. While JavaScript is used to retrieve the DOM object in the illustrated example, any other framework, such as, for example, ActiveX, Microsoft Silverlight, etc., may be used to retrieve the DOM object. In some examples, the metadata retriever 330 retrieves operational information about the media presenter 310 and/or, more generally, the browser 165. The retrieved operational information may include, for example, information about whether the media presenter 310 is fully or partially visible (e.g., the media presenter 310 is fully viewable, the media presenter 310 is 50% viewable, the media presenter 310 is not viewable, etc.), information about whether the media presenter 310 is in the foreground or background, etc. In some examples, the operational information is transmitted to the audience measurement entity to enable computation of additional media presentation metrics (e.g., whether users listen to streaming audio with the media presenter 310 in the background, etc.).

The metadata converter 340 of the illustrated example of FIG. 3 is implemented by a logic circuit such as a processor executing instructions, but it could additionally or alternatively be implemented by an analog circuit, an ASIC, DSP, FPGA, and/or other circuitry. In some examples, the media presenter 310, the event listener 320, the metadata retriever 330, and the metadata converter 340 are implemented by the same physical processor. In the illustrated example, the metadata converter 340 converts the metadata retrieved by the metadata retriever 330 into a format for transmission to the database proprietor 180, 182. For example, the metadata converter 340 may encrypt, decrypt, compress, modify, etc., the metadata and/or portions of the metadata to, for example, reduce the amount of data to be transmitted to the database proprietor 180, 182. In some examples, the metadata converter 340 encrypts the media-identifying metadata to prevent the database proprietor 180, 182 from identifying the media. In such an example, the database proprietor 180, 182 transmits demographic information in association with the encrypted media-identifying metadata to the central facility 170. The central facility 170 (e.g., the audience measurement entity) decrypts the encrypted media-identifying metadata to identify the presented media.

The metadata transmission location determiner 345 of the illustrated example of FIG. 3 is implemented by a logic circuit such as a processor executing instructions, but it could additionally or alternatively be implemented by an analog circuit, an ASIC, DSP, FPGA, and/or other circuitry. In some examples, the media presenter 310, the event listener 320, the metadata retriever 330, the metadata converter 340, and the metadata transmission location determiner 345 are implemented by the same physical processor. In the illustrated example, the metadata transmission location determiner 345 inspects the metadata and/or information transmitted with the metadata to determine where to transmit a dummy request carrying the metadata and any associated user-identifying information (e.g., the user identifiers 166A, 166B). In the illustrated example, the metadata is transmitted as an ID3 tag. In some such examples, the ID3 tag includes a destination to which the dummy request should be transmitted. In the illustrated example, the destination is a universal resource locator (URL) that includes the media-identifying information as well as specifying the Internet domain where it should be transmitted (e.g., databaseproprietor.com/<media-identifying information>). However, in some examples, the destination and the media-identifying information are transmitted separately. In such an example, the metadata transmission location determiner 345 determines a URL based on the destination and the media-identifying information.

In some examples, different service providers implement the monitoring instructions to specify the destination (e.g., the specific database proprietor) where the media-identifying information is to be transmitted. Different service providers may, accordingly, be associated with different database proprietors. Associations with different database proprietors may result in a more efficient and/or more accurate recordation of media impressions and association of those impressions with demographic information. For example, users who view media at a financial website may be more readily identifiable by a database proprietor associated with financial services (e.g., a stock broker, a credit bureau, Experian, etc.) than a database proprietor associated with social media (e.g., Facebook, Twitter, etc.). Therefore, a service provider may create the monitoring instructions to cause the client device to send a dummy request to a specific database proprietor (e.g., Experian) that matches the media to be annotated.

In the illustrated example, a destination field of the ID3 tag conveying the media-identifying metadata includes a destination field that, when interpreted by the monitoring instructions, causes the monitoring instructions to send the dummy request to the specified destination (e.g., a URL). In such an example, at the direction of the monitoring instructions, the client device determines the location to send the dummy request based on the destination field of the ID3 tag. Such an example of determining where to send the dummy request based on the destination field of the ID3 tag is disclosed in connection with blocks 810 and 815 of FIG. 8. Alternatively, the monitoring instructions for a given service provider may direct the client device to send the dummy request to a pre-determined location. That is, rather than determining the location based on the destination field of the ID3 tag, the location is based on an instruction of the monitoring instructions. In some examples, the instruction is a JavaScript instruction implemented by the metadata transmission location determiner 345. An example of determining where to send the dummy request based on an instruction of the monitoring instructions is disclosed in connection with blocks 820 and 825 of FIG. 8.

The transmitter 350 of the illustrated example of FIG. 3 is implemented by a logic circuit such as a processor executing instructions, but it could additionally or alternatively be implemented by an analog circuit, an ASIC, DSP, FPGA, and/or other circuitry. In some examples, the media presenter 310, the event listener 320, the metadata retriever 330, the metadata converter 340, the metadata transmission location determiner 345, and the transmitter 350 are implemented by the same physical processor. In the illustrated example, the transmitter 350 transmits the media-identifying information and/or the user-identifying information (e.g., the user identifiers 166A, 166B) to the database proprietor 180, 182 via, for example, the Internet. While the media-identifying information is transmitted in substantially real-time in the illustrated example, in some examples, the media-identifying information is stored, cached, and/or buffered before being transmitted to the database proprietor 180, 182. Also, while the media-identifying information is transmitted to the database proprietor 180, 182 in the illustrated example, in some examples, the media-identifying information is transmitted to a different destination such as, for example, the central facility 170. Additionally or alternatively, the transmitter 350 may transmit a user identifier 166A, 166B of the browser 165 and/or the client device 160 to enable the database proprietor 180, 182 to correlate the media presentation with a user, a demographic, etc. In some examples, the media-identifying information is encrypted before transmission by the transmitter 350. Encrypting the media-identifying information prevents the database proprietor 180, 182 from gaining access to information about what media is identified. In some examples, the transmitter 350 transmits the operational information retrieved by the metadata retriever 330 along with the media-identifying information.

The user-identifying information store 355 of the illustrated example is implemented by a memory for storing information (e.g., user-identifying information, cookies, etc.) The example user-identifying information store 355 of the illustrated example of FIG. 3 may be any device for storing data such as, for example, flash memory, magnetic media, optical media, etc. In the illustrated example, the user-identifying information store 355 is implemented by random access memory of the client device 160. Furthermore, the data stored in the user-identifying information store 355 may be in any data format such as, for example, binary data, comma delimited data, tab delimited data, structured query language (SQL) structures, etc. While in the illustrated example the user-identifying information store 355 is illustrated as a single database, the user-identifying information store 355 may be implemented by multiple databases, and/or be stored in multiple memory locations of the media device. In the illustrated example, each piece of user identifying information is stored in association with a domain. When requests (e.g., the dummy request of line 187 of FIG. 1) are transmitted, only the user-identifying information associated with the destination domain is sent.

Figure 4:
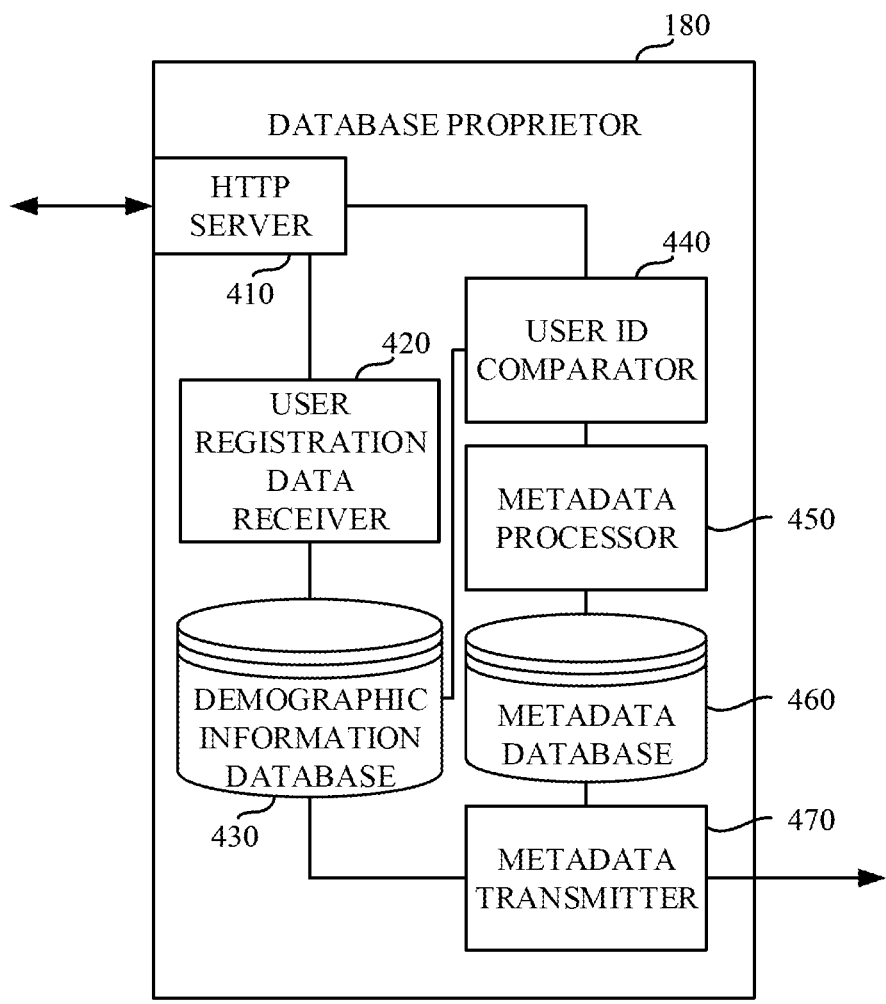
FIG. 4 is a block diagram of an example implementation of the database proprietor of FIG. 1.

FIG. 4 is a block diagram of an example implementation of the database proprietor 180, 182 of FIGS. 1, 2, and/or 2A. The database proprietor 180, 182 of the illustrated example of FIG. 4 includes an HTTP server 410, a user registration data receiver 420, a demographic information database 430, a user ID comparator 440, a metadata processor 450, metadata database 460, and a metadata transmitter 470.

The HTTP server 410 of the illustrated example of FIG. 4 is implemented by a processor executing instructions, but it could additionally or alternatively be implemented by an analog circuit, an ASIC, DSP, FPGA, and/or other circuitry. In the illustrated example, the example HTTP server 410 receives requests from the browser 165 that include, for example, the user identifiers 166A, 166B, and/or the media identifying information (which may be encrypted) identified by the browser 165. The example HTTP server 410 of FIG. 4 responds to the requests from the browser 165 with an HTTP acknowledge message and/or an HTTP redirect message. While in the illustrated example, the HTTP server 410 communicates using the HTTP protocol, any other protocol may additionally and/or alternatively be used such as, for example, the HTTPS protocol, the FTP protocol, etc.

The user registration data receiver 420 of the illustrated example of FIG. 4 is implemented by a processor executing instructions, but it could additionally or alternatively be implemented by an analog circuit, an ASIC, DSP, FPGA, and/or other circuitry. In some examples, the user registration data receiver 420 and the HTTP server 410 are implemented by the same physical processor. In the illustrated example, the example user registration data receiver 420 receives registration data from the user of the client device 160. The registration data may include, for example, demographic information, a username, geographic information, and/or any other information associated with the user. In the illustrated example, the user registration data receiver 420 receives the registration information from the user via the HTTP server 410. That is, the registration information is received via a network such as, for example, the Internet. However, the user information may be received in any other fashion. For example, the user registration data may be received via a telephone call, facsimile transmission, manual entry, etc. the user registration data receiver 420 of the illustrated example of FIG. 4 stores the user registration data in the demographic information database 430.

The demographic information database 430 of the illustrated example is implemented by a memory for storing user registration data (e.g., demographic information associated with users). The example demographic information database 430 of the illustrated example of FIG. 4 may be any device for storing data such as, for example, flash memory, magnetic media, optical media, etc. In the illustrated example, the demographic information database 430 is implemented by random access memory of the database proprietor 180, 182. Furthermore, the data stored in the demographic information database 430 may be in any data format such as, for example, binary data, comma delimited data, tab delimited data, structured query language (SQL) structures, etc. While in the illustrated example the demographic information database 430 is illustrated as a single database, the demographic information database 430 may be implemented by multiple databases, and/or be stored in multiple memory locations of the database proprietor 180, 182.

The user ID comparator 440 of the illustrated example of FIG. 4 is implemented by a processor executing instructions, but it could additionally or alternatively be implemented by an analog circuit, an ASIC, DSP, FPGA, and/or other circuitry. In some examples, the example user ID comparator 440, the example HTTP server 410, and the example user registration data receiver 420 are implemented by the same physical processor. In the illustrated example, the user ID comparator 440 receives the dummy request from the browser 165 via the HTTP server 410 (e.g., the dummy request of line 187 of FIG. 1). The dummy request may include the user identifier 168A, 166B. Accordingly the user ID comparator 440 inspects the request to determine whether the user identifier is present, and/or, if present, whether the user identifier can be used to determine a user ID. If the user cannot be identified (e.g., the user identifier is unknown or is not present), the user ID comparator 440 signals to the HTTP server 410 that the browser 165 should be redirected to a different location (e.g., the database proprietor 182, the central facility 170). If the user can be identified, the user ID comparator 440 communicates the media-identifying metadata (which may be encrypted) and the user ID to the metadata database 460.

The metadata processor 450 of the illustrated example of FIG. 4 is implemented by a processor executing instructions, but it could additionally or alternatively be implemented by an analog circuit, an ASIC, DSP, FPGA, and/or other circuitry. In some examples, the metadata processor 450, the example HTTP server 410, the example user registration data receiver 420, and the example user ID comparator 440 are implemented by the same physical processor. In the illustrated example, the metadata processor 450 stores the user ID identified by the user ID comparator 440 in association with the media identifying metadata (which may be encrypted) in the metadata database 460.

The metadata database 460 is implemented by a memory for storing media-identifying metadata received from the browser via the dummy request (e.g., the request represented by line 187 of FIG. 1). The example metadata database 460 of the illustrated example of FIG. 4 may be implemented by any device for storing data such as, for example, flash memory, magnetic media, optical media, etc. In the illustrated example, the metadata database 460 is implemented by random access memory of the database proprietor 180, 182. Furthermore, the data stored in the metadata database 460 may be in any data format such as, for example, binary data, comma delimited data, tab delimited data, structured query language (SQL) structures, etc. While in the illustrated example the metadata database 460 is illustrated as a single database, the metadata database 460 may be implemented by multiple databases, and/or be stored in multiple memory locations of the database proprietor 180, 182. Furthermore, while in the illustrated example the metadata database 460 and the demographic information database 430 are implemented as separate databases, the example metadata database 460 and the example demographic information database 430 may be implemented using a single (i.e., the same) database.

The metadata transmitter 470 of the illustrated example of FIG. 4 is implemented by a processor executing instructions, but it could additionally or alternatively be implemented by an analog circuit, an ASIC, DSP, FPGA, and/or other circuitry. In some examples, the example metadata transmitter 470, the example HTTP server 410, the example user registration data receiver 420, the example user ID comparator 440, and the example metadata processor 450 are implemented by the same physical processor. In the illustrated example, the metadata transmitter 470 transmits demographic information associated with users to which media (identified by the media identifying metadata) was presented to the central facility 170. In the illustrated example, the metadata transmitter 470 transmits demographic information and the associated media-identifying metadata (which may be encrypted) when the media has been presented to a threshold number of users. As such, the demographic information is aggregated across the users to which the media was presented. However, in some examples, demographic information is transmitted on an individual basis. In the illustrated example, the metadata transmitter 470 transmits the data to the central facility 170 regardless of whether the central facility 170 has requested the data. However, in some examples, the central facility 170 may request the metadata transmitter 470 to transmit the data.

Figure 4A:
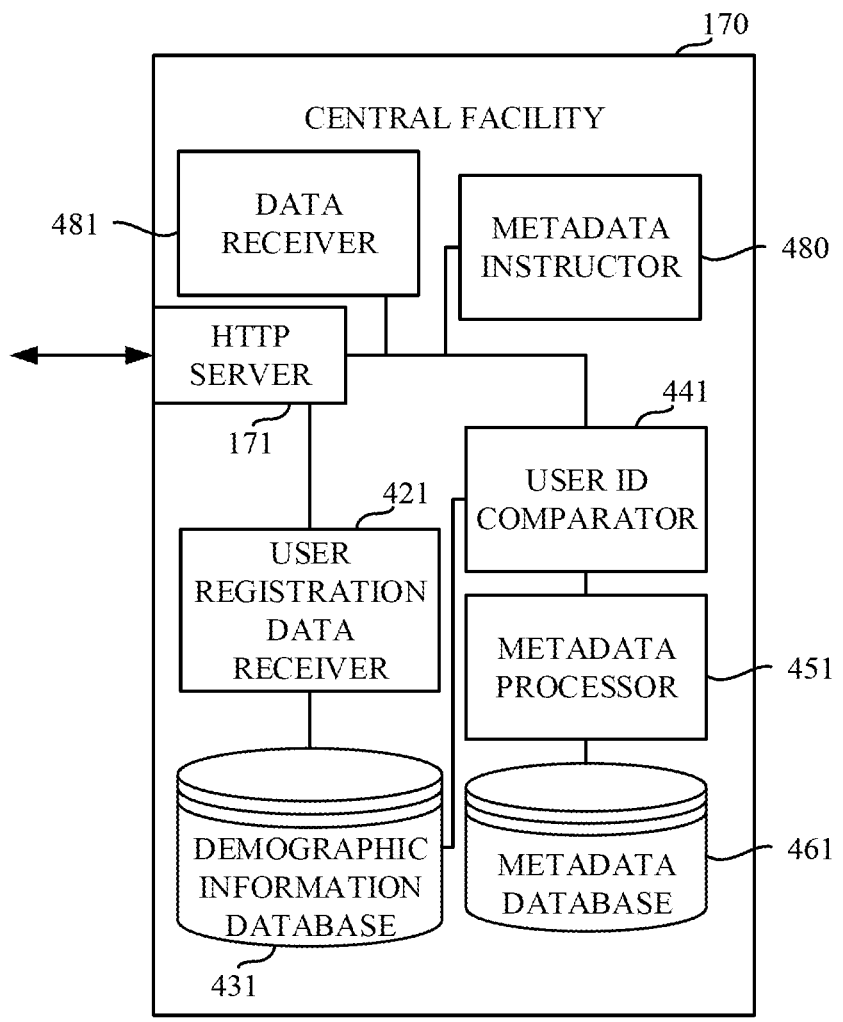
FIG. 4A is a block diagram of an example implementation of the central facility of FIG. 1.

FIG. 4A is a block diagram of an example implementation of the central facility 170 of FIGS. 1, 2, and/or 2A. The central facility 170 of the illustrated example of FIG. 4A includes an HTTP server 171, a user registration data receiver 421, a demographic information database 431, a user ID comparator 441, a metadata processor 451, metadata database 461, a metadata instructor 480, and a data receiver 481.

The HTTP server 171 of the illustrated example of FIG. 4A is implemented by a processor executing instructions, but it could additionally or alternatively be implemented by an analog circuit, an ASIC, DSP, FPGA, and/or other circuitry. In the illustrated example, the example HTTP server 171 receives requests from the browser 165 that include, for example, the user identifiers 166A, 166B, and/or the media identifying information (which may be encrypted) identified by the browser 165. The example HTTP server 171 of FIG. 4A responds to the requests from the browser 165 with an HTTP acknowledge message and/or an HTTP redirect message. While in the illustrated example, the HTTP server 171 communicates using the HTTP protocol, any other protocol may additionally and/or alternatively be used such as, for example, the HTTPS protocol, the FTP protocol, etc.

The user registration data receiver 421 of the illustrated example of FIG. 4A is implemented by a processor executing instructions, but it could additionally or alternatively be implemented by an analog circuit, an ASIC, DSP, FPGA, and/or other circuitry. In some examples, the user registration data receiver 421 and the HTTP server 171 are implemented by the same physical processor. In the illustrated example, the example user registration data receiver 421 receives registration data from the user of the client device 160. The registration data may include, for example, demographic information, a username, geographic information, and/or any other information associated with the user. In the illustrated example, the user registration data receiver 421 receives the registration information from the user via the HTTP server 171. That is, the registration information is received via a network such as, for example, the Internet. However, the user information may be received in any other fashion. For example, the user registration data may be received via a telephone call, facsimile transmission, manual entry, etc. the user registration data receiver 421 of the illustrated example of FIG. 4A stores the user registration data in the demographic information database 431.

The demographic information database 431 of the illustrated example is implemented by a memory for storing user registration data (e.g., demographic information associated with users). The example demographic information database 431 of the illustrated example of FIG. 4A may be any device for storing data such as, for example, flash memory, magnetic media, optical media, etc. In the illustrated example, the demographic information database 431 is implemented by random access memory of the central facility 170. Furthermore, the data stored in the demographic information database 431 may be in any data format such as, for example, binary data, comma delimited data, tab delimited data, structured query language (SQL) structures, etc. While in the illustrated example the demographic information database 431 is illustrated as a single database, the demographic information database 431 may be implemented by multiple databases, and/or be stored in multiple memory locations of the central facility 170.

The user ID comparator 441 of the illustrated example of FIG. 4A is implemented by a processor executing instructions, but it could additionally or alternatively be implemented by an analog circuit, an ASIC, DSP, FPGA, and/or other circuitry. In some examples, the example user ID comparator 441, the example HTTP server 171, and the example user registration data receiver 421 are implemented by the same physical processor. In the illustrated example, the user ID comparator 441 receives the dummy request from the browser 165 via the HTTP server 411 (e.g., the dummy request of line 197 of FIG. 2A). The dummy request may include the user identifier 168A, 166B. Accordingly the user ID comparator 441 inspects the request to determine whether the user identifier is present, and/or, if present, whether the user identifier can be used to determine a user ID. If the user cannot be identified (e.g., the user identifier is unknown or is not present in the request), the user ID comparator 441 signals to the HTTP server 171 that the browser 165 should be redirected to a different location (e.g., the database proprietor 182, the central facility 170). If the user can be identified, the user ID comparator 441 communicates the media-identifying metadata (which may be encrypted) and the user ID to the metadata database 461.

The metadata processor 451 of the illustrated example of FIG. 4A is implemented by a processor executing instructions, but it could additionally or alternatively be implemented by an analog circuit, an ASIC, DSP, FPGA, and/or other circuitry. In some examples, the metadata processor 451, the example HTTP server 171, the example user registration data receiver 421, and the example user ID comparator 441 are implemented by the same physical processor. In the illustrated example, the metadata processor 451 stores the user ID identified by the user ID comparator 441 in association with the media identifying metadata (which may be encrypted) in the metadata database 461.

The metadata database 461 is implemented by a memory for storing media-identifying metadata received from the browser via the dummy request (e.g., the request represented by line 197 of FIG. 2A). Moreover, the example metadata database 461 store demographic information and metadata received from the database proprietor 180, 182 via the data receiver 481. The example metadata database 461 of the illustrated example of FIG. 4A may be implemented by any device for storing data such as, for example, flash memory, magnetic media, optical media, etc. In the illustrated example, the metadata database 461 is implemented by random access memory of the central facility 170. Furthermore, the data stored in the metadata database 461 may be in any data format such as, for example, binary data, comma delimited data, tab delimited data, structured query language (SQL) structures, etc. While in the illustrated example the metadata database 461 is illustrated as a single database, the metadata database 461 may be implemented by multiple databases, and/or be stored in multiple memory locations of the central facility 170. Furthermore, while in the illustrated example the metadata database 461 and the demographic information database 431 are implemented as separate databases, the example metadata database 461 and the example demographic information database 431 may be implemented using a single (i.e., the same) database.

The metadata instructor 480 of the illustrated example of FIG. 4A is implemented by a processor executing instructions, but it could additionally or alternatively be implemented by an analog circuit, an ASIC, DSP, FPGA, and/or other circuitry. In some examples, the metadata instructor 480, the example metadata processor 451, the example HTTP server 171, the example user registration data receiver 421, and the example user ID comparator 441 are implemented by the same physical processor. In the illustrated example, the example metadata instructor 480 of the example central facility 170 instructs the metadata embedder 135 and/or, more generally, the service provider 120 to embed a tag in media to be streamed. In the illustrated example, the metadata embedder 135 instructs the metadata embedder 135 to format the tag as an ID3 tag. The tag is to cause a client device (e.g., the browser 165 and/or more generally the client device 160) to send a message to the central facility 170.

Figure 5:
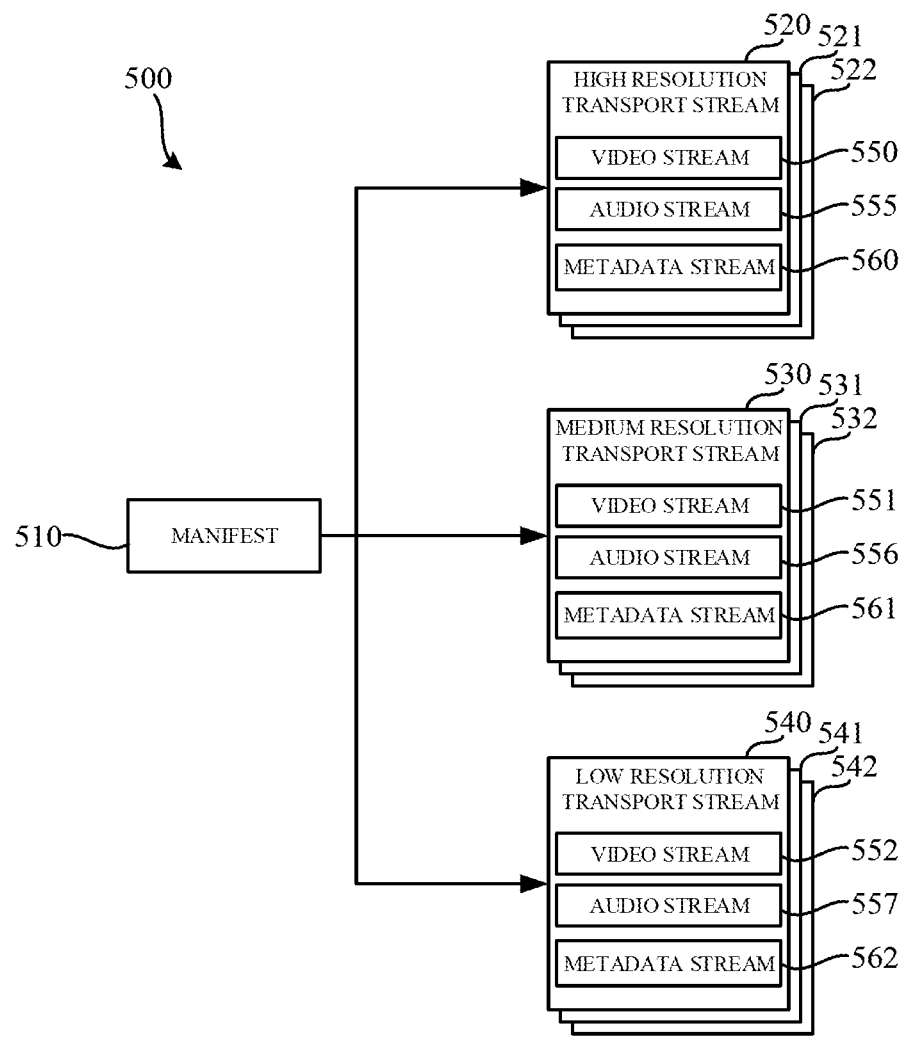
FIG. 5 is a block diagram of an example implementation of an example HLS stream that may be displayed by the example browser of FIGS. 1, 2, and/or 3.

The data receiver 481 of the illustrated example of FIG. 4A is implemented by a processor executing instructions, but it could additionally or alternatively be implemented by an analog circuit, an ASIC, DSP, FPGA, and/or other circuitry. In some examples, the data receiver 481, the example metadata processor 451, the example HTTP server 171, the example user registration data receiver 421, and the example user ID comparator 441 are implemented by the same physical processor. The example data receiver 481 of the illustrated example of FIG. 4A receives metadata and demographic information from the database proprietor 180, 182. FIG. 5 is a block diagram of an example implementation of an example HLS stream 500 that may be displayed by the example media presenter 310 of FIG. 3. In the illustrated example of FIG. 5, the HLS stream 500 includes a manifest 510 and three transport streams. In the illustrated example, the manifest 510 is an .m3u8 file that describes the available transport streams to the client device. However, any other past, present, and/or future file format may additionally or alternatively be used. In the illustrated example, the client device retrieves the manifest 510 in response to an instruction to display an HLS element.

HLS is an adaptive format, in that, although multiple devices retrieve the same manifest 510, different transport streams may be displayed depending on one or more factors. For example, devices having different bandwidth availabilities (e.g., a high speed Internet connection, a low speed Internet connection, etc.) and/or different display abilities (e.g., a small size screen such as a cellular phone, a medium size screen such as a tablet and/or a laptop computer, a large size screen such as a television, etc.) select an appropriate transport stream for their display and/or bandwidth abilities. In some examples, a cellular phone having a small screen and limited bandwidth uses a low resolution transport stream. Alternatively, in some examples, a television having a large screen and a high speed Internet connection uses a high resolution transport stream. As the abilities of the device change (e.g., the device moves from a high speed Internet connection to a low speed Internet connection) the device may switch to a different transport stream.

In the illustrated example of FIG. 5, a high resolution transport stream 520, a medium resolution transport stream 530, and a low resolution transport stream 540 are shown. In the illustrated example, each transport stream 520, 530, and/or 540 represents a portion of the associated media (e.g., five seconds, ten seconds, thirty seconds, one minute, etc.). Accordingly, the high resolution transport stream 520 corresponds to a first portion of the media, a second high resolution transport stream 521 corresponds to a second portion of the media, a third high resolution transport stream 522 corresponds to a third portion of the media. Likewise, the medium resolution transport stream 530 corresponds to the first portion of the media, a second medium resolution transport stream 531 corresponds to the second portion of the media, and a third medium resolution transport stream 532 corresponds to the third portion of the media. In addition, the low resolution transport stream 540 corresponds to the first portion of the media, a second low resolution transport stream 541 corresponds to the second portion of the media, and a third low resolution transport stream 542 corresponds to the third portion of the media. Although three transport streams are shown in the illustrated example of FIG. 5 for each resolution, any number of transport streams representing any number of corresponding portions of the media may additionally or alternatively be used.

In the illustrated example, each transport stream 520, 521, 522, 530, 531, 532, 540, 541, and/or 542 includes a video stream 550, 551, 552, an audio stream 555, 556, 552, and a metadata stream 560, 561, 562. The video stream 550, 551, and/or 552 includes video associated with the media at different resolutions according to the resolution of the transport stream with which the video stream is associated. The audio stream 555, 556, and/or 557 includes audio associated with the media. The metadata stream 560, 561, and/or 562 includes metadata such as, for example, an ID3 tag associated with the media.

In examples disclosed herein, the ID3 tag is formatted as an ID3v2 tag. However, any other type and/or format of metadata and/or metadata container may additionally or alternatively be used. In the illustrated example, the media-identifying information is stored in a private frame of the ID3 tag. However, the media-identifying information may be stored in any other location. The media-identifying information of the illustrated example includes a destination domain name and a textual version of the audio watermark identified by the media identifier 125 of FIGS. 1 and/or 2. In the illustrated example, the audio watermark is stored in a base-64 encrypted format. However, the watermark may be stored in any other fashion. Furthermore, while in the illustrated example, the ID3 tag includes the destination domain name and the audio watermark, any other information may additionally or alternatively be included in the ID3 tag such as, for example, an identifier of the media provider 110, an identifier of the service provider 120, an identifier of the central facility 170, etc.

While an example manner of implementing the example service provider 120 of FIGS. 1, 2, and/or 2A, the example browser 165 of FIGS. 1, 2, and/or 3, the example central facility 170 of FIGS. 1, 2, 2A, and/or 4A, and/or the example database proprietor 180, 182 of FIGS. 1, 2, 2A, and/or 4 are illustrated in FIGS. 1, 2, 2A, 3, 4, and/or 4A, one or more of the elements, processes and/or devices illustrated in FIGS. 1, 2, 2A, 3, 4, and/or 4A may be combined, divided, re-arranged, omitted, eliminated and/or implemented in any other way. Further, the example media identifier 125, the example transcoder 130, the example metadata embedder 135, the example media transmitter 140 and/or, more generally, the example service provider 120 of FIGS. 1 2, and/or 2A; the example media presenter 310, the example event listener 320, the example metadata retriever 330, the example metadata converter 340, the example metadata transmission location determiner 345, the example transmitter 350, the example user identifying information store 355, and/or, more generally the example browser 165 of FIGS. 1, 2, 2A, and/or 3; the example HTTP server 171, the example user registration data receiver 421, the example demographic information database 431, the example user ID comparator 441, the example metadata processor 451, the example metadata database 461, the example metadata instructor 480, the example data receiver 481, and/or, more generally, the example central facility 170 of FIGS. 1, 2, 2A, and/or 4A; and/or the example HTTP server 410, the example user registration data receiver 420, the example demographic information database 430, the example user ID comparator 440, the example metadata processor 450, the example metadata database 460, the example metadata transmitter 470, and/or, more generally, the example database proprietor 180, 182 of FIGS. 1, 2, 2A, and/or 4 may be implemented by hardware, software, firmware and/or any combination of hardware, software and/or firmware. Thus, for example, any of the example media identifier 125, the example transcoder 130, the example metadata embedder 135, the example media transmitter 140 and/or, more generally, the example service provider 120 of FIGS. 1, 2, and/or 2A; the example media presenter 310, the example event listener 320, the example metadata retriever 330, the example metadata converter 340, the example metadata transmission location determiner 345, the example transmitter 350, the example user identifying information store 355, and/or, more generally the example browser 165 of FIGS. 1, 2, 2A, and/or 3; the example HTTP server 171, the example user registration data receiver 421, the example demographic information database 431, the example user ID comparator 441, the example metadata processor 451, the example metadata database 461, the example metadata instructor 480, the example data receiver 481, and/or, more generally, the example central facility 170 of FIGS. 1, 2, 2A, and/or 4A; and/or the example HTTP server 410, the example user registration data receiver 420, the example demographic information database 430, the example user ID comparator 440, the example metadata processor 450, the example metadata database 460, the example metadata transmitter 470, and/or, more generally, the example database proprietor 180, 182 of FIGS. 1, 2, 2A, and/or 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media identifier 125, the example transcoder 130, the example metadata embedder 135, the example media transmitter 140 and/or, more generally, the example service provider 120 of FIGS. 1, 2, and/or 2A; the example media presenter 310, the example event listener 320, the example metadata retriever 330, the example metadata converter 340, the example metadata transmission location determiner 345, the example transmitter 350, the example user identifying information store 355, and/or, more generally the example browser 165 of FIGS. 1, 2, 2A, and/or 3; the example HTTP server 171, the example user registration data receiver 421, the example demographic information database 431, the example user ID comparator 441, the example metadata processor 451, the example metadata database 461, the example metadata instructor 480, the example data receiver 481, and/or, more generally, the example central facility 170 of FIGS. 1, 2, 2A, and/or 4A; and/or the example HTTP server 410, the example user registration data receiver 420, the example demographic information database 430, the example user ID comparator 440, the example metadata processor 450, the example metadata database 460, the example metadata transmitter 470, and/or, more generally, the example database proprietor 180, 182 of FIGS. 1, 2, 2A, and/or 4 is/are hereby expressly defined to include a tangible computer readable storage device or storage disk such as a memory, a digital versatile disk (DVD), a compact disk (CD), a Blu-ray disk, etc. storing the software and/or firmware. Further still, the example service provider 120 of FIGS. 1, 2, and/or 2A, the example browser 165 of FIGS. 1, 2, 2A, and/or 3, the example central facility 170 of FIGS. 1, 2, 2A, and/or 4A, and/or the example database proprietor 180, 182 of FIGS. 1, 2, 2A, and/or 4 may include one or more elements, processes and/or devices in addition to, or instead of, those illustrated in FIGS. 1, 2, 2A, 3, 4, and/or 4A, and/or may include more than one of any or all of the illustrated elements, processes and devices.

Flowcharts representative of example machine readable instructions for implementing the example service provider 120 of FIGS. 1, 2, and/or 2A, the example browser 165 of FIGS. 1, 2, 2A, and/or 3, the example central facility 170 of FIGS. 1, 2, 2A, and/or 4A, and/or the example database proprietor 180, 182 of FIGS. 1, 2, 2A, and/or 4 are shown in FIGS. 6, 7, 8, 9, 10, and/or 11. In these examples, the machine readable instructions comprise a program(s) for execution by a processor such as the processor 1212 shown in the example processor platform 1200 discussed below in connection with FIG. 12. The program may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart(s) illustrated in FIGS. 6, 7, 8, 9, 10, and/or 11, many other methods of implementing the example service provider 120 of FIGS. 1, 2, and/or 2A, the example browser 165 of FIGS. 1, 2, 2A, and/or 3, the example central facility 170 of FIGS. 1, 2, 2A, and/or 4A, and/or the example database proprietor 180, 182 of FIGS. 1, 2, 2A, and/or 4 may alternatively be used. For example, the order of execution of the blocks may be changed, and/or some of the blocks described may be changed, eliminated, or combined.

As mentioned above, the example processes of FIGS. 6, 7, 8, 9, 10, and/or 11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 6, 7, 8, 9, 10, and/or 11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 6:
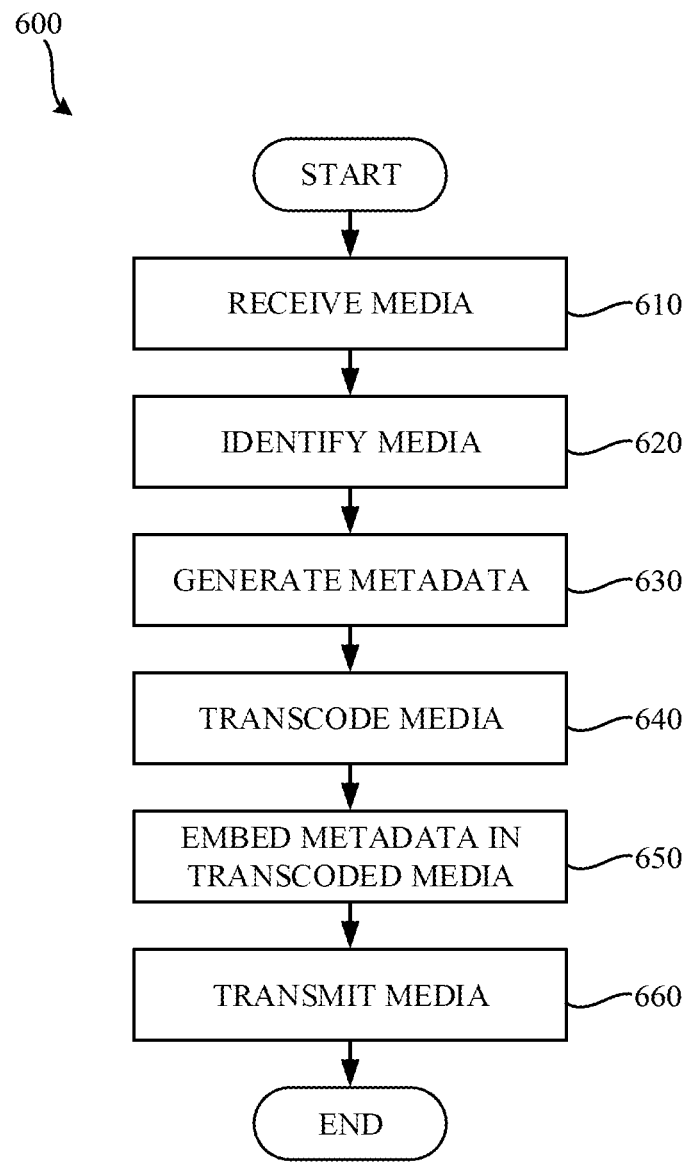
FIG. 6 is a flowchart representative of example machine-readable instructions which may be executed to implement the example service provider of FIGS. 1 and/or 2.

FIG. 6 is a flowchart representative of example machine-readable instructions 600 which may be executed to implement the example service provider 120 of FIGS. 1 and/or 2. Execution of the example machine-readable instructions 600 of FIG. 6 begins with the media identifier 125 of the service provider 120 receiving the media from the media provider 110 (block 610). In the illustrated example, the media is received as it is broadcast (e.g., live). However, in some examples, the media is stored and/or cached by the media identifier 125.

The media identifier 125 of the illustrated example then identifies the media (block 620). The media identifier 125 identifies the media by extracting metering data (e.g., signatures, watermarks, etc.) from the media. Based on the extracted metering data, the media identifier 125 generates metadata (block 630). In the illustrated example, the metadata is generated in an ID3 format. However, any other metadata format may additionally or alternatively be used. Further, in the illustrated example, the metadata is generated based on the extracted metering data. However, in some examples, the metadata may be generated by querying an external source using some or all of the extracted metering data.

The media is then transcoded by the transcoder 130 of the service provider 120 (block 640). In the illustrated example, the media is transcoded into an MPEG2 transport stream that may be transmitted via HTTP live streaming (HLS). The metadata embedder 135 of the service provider 120 embeds the metadata into the media (block 650). In some examples, the metadata is encrypted prior to being embedded into the media. In the illustrated example, the metadata is embedded into a metadata channel of the media. However, in some examples, the metadata may be embedded in an ancillary data document, file, etc. that may be associated with the media. For example, the metadata may be embedded in a manifest file (e.g., an M3U8 file), in a text track associated with the media, etc.

The media is then transmitted by the media transmitter 140 of the service provider 120 (block 660). In the illustrated example, the media is transmitted using HTTP live streaming (HLS). However, any other format and/or protocol for transmitting (e.g., broadcasting, unicasting, multicasting, etc.) media may additionally or alternatively be used.

Figure 7:
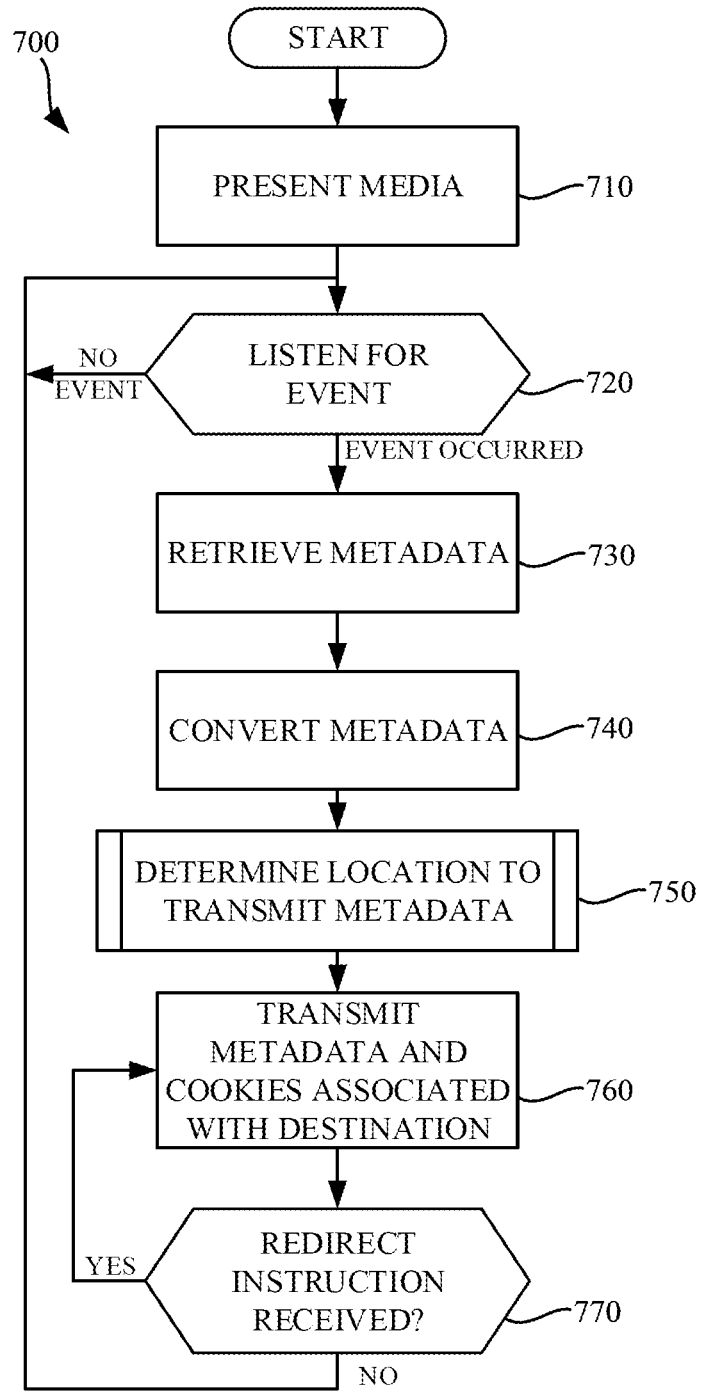
FIGS. 7 and 8 are flowcharts representative of example machine-readable instructions which may be executed to implement the example browser of FIGS. 1, 2, and/or 3.

FIG. 7 is a flowchart representative of example machine-readable instructions 700 which may be executed to implement the example browser 165 of FIGS. 1, 2, and/or 3. Execution of the example machine-readable instructions 700 of FIG. 7 begins with the browser 165 being instantiated (e.g., by being loaded by the client device 160). The media presenter 310 of the browser 165 then begins presenting media (block 710) by, for example, loading a display object for presentation via the client device 160. In the illustrated example, the display object is a QuickTime® object. However, any other type of display object may additionally or alternatively be used.

The event listener 320 of the browser 165 begins listening for an event (block 720). In the illustrated example, the event listener 320 listens for a JavaScript event triggered by the media presenter 210. However, in some examples, the event listener 320 listens for any other event(s) such as, for example, a media change event, a user interaction event (e.g., when a user clicks on an object), a display event (e.g., a page load), etc. If the event listener 320 does not detect an event, the event listener 320 continues to listen for the event until, for example, the browser 165 is closed, a different webpage is loaded, etc.

If the event listener 320 detects an event, the metadata retriever 330 of the browser 165 retrieves the metadata (block 730). In the illustrated example, the event listener 320 passes an event object to the metadata retriever 330, which inspects the event object to retrieve the metadata. However, in some examples, the event listener 320 passes an identifier of an object (e.g., the media presenter 310 display object), which indicates the object from which the metadata retriever 330 is to retrieve metadata. In the illustrated example, the metadata retriever 330 inspects a document object module (DOM) object to retrieve the metadata. However, in some examples, the metadata retriever 330 inspects, for example, a timed text track, a metadata stream of the HLS media, etc. to retrieve the metadata. In the illustrated example, the metadata is formatted as an ID3 tag. However, any other format of metadata may additionally or alternatively be used. In some examples, the metadata retriever 330 retrieves operational information about the media presenter 310 and/or, more generally, the browser 165. The retrieved operational information may include, for example, information about whether the media presenter 310 is fully or partially visible (e.g., the media presenter 310 is fully viewable, the media presenter 310 is 50% viewable, the media presenter 310 is not viewable, etc.), information about whether the media presenter 310 is in the foreground or background, etc.

The metadata converter 340 of the browser 165 then converts the metadata (block 740) into a format for use by the transmitter 350 of the browser 165. In the illustrated example, the metadata is converted from a binary data format into a text format. In some examples, the metadata is parsed to identify portions (e.g., fields, sections, etc.) of interest of the metadata (e.g., a genre, an artist, a song title, an album name, a transmitting station/server site, etc.). In some examples, the metadata converter 340 encrypts the metadata. Encrypting the metadata prevents third parties (e.g., the database proprietor) from identifying the media, while still permitting logging of impressions for association with demographics. In the illustrated example, the metadata converter 340 adds a timestamp to the metadata prior to transmitting the metadata to the database proprietor 180, 182. Timestamping (e.g., recording a time that an event occurred) enables accurate identification and/or correlation of media that was presented and/or the time that it was presented with the user(s) of the presentation device.

In some examples, the metadata may not undergo conversion before transmission by the transmitter (e.g., the metadata may be sent in the format in which it is retrieved by the metadata retriever 330). In such examples, the database proprietor 180, 182, and/or the central facility 170 converts the metadata by, for example, converting the metadata to a different format, parsing the metadata to identify portions of interest of the metadata, decrypting the metadata, etc. Conversion of the metadata by the database proprietor 180, 182, and/or the central facility 170 facilitates correlation of the media that was presented with an identifier identifying to whom the media was presented. In some examples, the database proprietor 180, 182, and/or the central facility 170 timestamps the metadata upon receipt. Timestamping the metadata enables accurate identification and/or correlation of media that was presented and/or the time that it was presented with the user(s) of the presentation device.

The metadata transmission location determiner 345 of the browser 165 then determines a location to which the metadata should be transmitted (block 750). In the illustrated example, the location is determined based on a domain name included in the ID3 tag. However, any other way of determining a location to transmit metadata may additionally or alternatively be used. An example process for determining the location to transmit the metadata is disclosed in connection with FIG. 8, below.

The transmitter 350 then transmits the metadata to the location identified by the metadata transmission location determiner 345 (block 750). In the illustrated example, the metadata is transmitted using an HTTP Post request. However, any other method of transmitting data and/or metadata may additionally or alternatively be used. For example, a file transfer protocol (FTP) instruction, an HTTP Get request, an Asynchronous JavaScript and extensible markup language (XML) (AJAX) message, etc., may be used to transmit the metadata. In some examples, the metadata is not transmitted to the database proprietor 180, 182, and/or the central facility 170. For example, the metadata may be transmitted to a display object of the client device 160 for display to a user. In the illustrated example, the metadata is transmitted in real-time (e.g., streamed) to the database proprietor 180, 182. However, in some examples, the metadata may be stored (e.g., cached, buffered, etc.) for a period of time before being transmitted to the database proprietor 180, 182. In some examples, the transmitter 350 transmits the operational data retrieved by the metadata retriever 330 from the media presenter 310. Transmitting the operational information enables the audience measurement entity to compute additional media presentation metrics (e.g., whether users listen to streaming audio with the media presenter 310 in the background, etc.).

Figure 8:
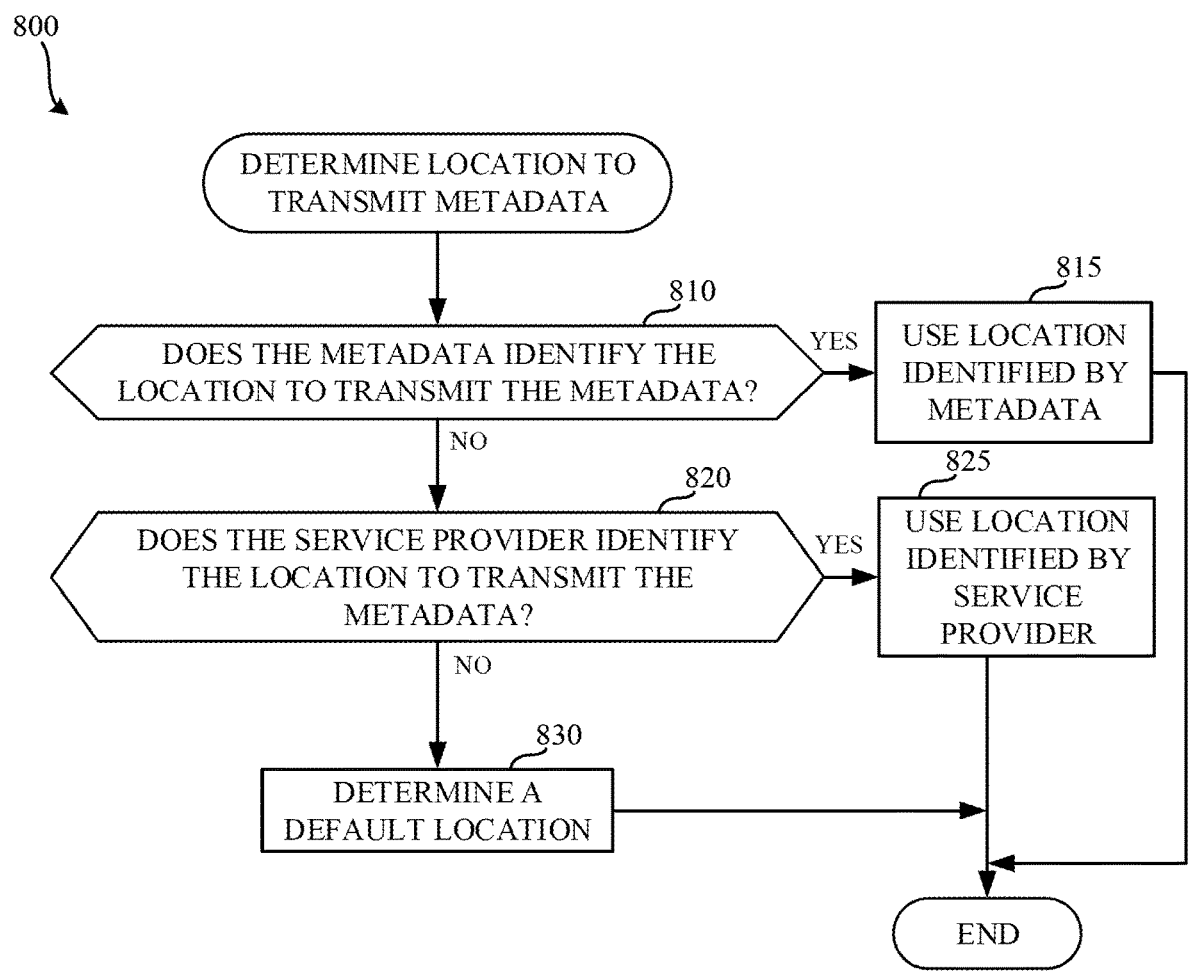

FIG. 8 is a flowchart representative of example machine-readable instructions 800 which may be executed to implement the example browser 165 of FIGS. 1, 2, and/or 3. The example flowchart of FIG. 8 represents a process wherein the metadata transmission location determiner 345 of FIG. 3 determines a destination to transmit metadata and/or user identifier data via, for example, the dummy request (e.g., line 187 of FIG. 1). Execution of the example machine-readable instructions 800 of FIG. 8 begins when the metadata transmission location determiner 345 determines whether the metadata included in the ID3 tag identified by the metadata retriever 330 of FIG. 3 identifies a location to transmit the metadata (block 810). In some examples, the ID3 tag includes a URL specifying where the metadata should be transmitted. The URL may identify, for example, a preferred database proprietor 180, 182. If the ID3 tag includes a URL specifying where the metadata should be transmitted (block 810), the metadata transmission location determiner 345 uses the location (e.g., the URL) identified by the metadata (block 815) to determine the destination of the dummy request.

However, in some examples, the ID3 tag does not identify the location to transmit the metadata. If the ID3 tag does not identify the location to transmit the metadata (block 810), the example metadata transmission location determiner 345 determines whether the service provider identifies the location transmit the metadata (block 820). In some examples, the service provider 120, when implementing the SDK associated with the monitoring instructions implemented by the browser 165, specifies a database proprietor to which the metadata should be transmitted. In such an example, the metadata transmission location determiner 345 uses the location identified by the service provider (block 825) to determine the destination of the dummy request.

In some examples, neither the metadata nor the service provider may identify the location where the metadata should be transmitted (blocks 810, 820). In such an example, the metadata transmission location determiner 345 uses a default location to transmit the metadata (block 830) to determine the destination of the dummy request. The default location may be, for example, a preferred database proprietor such as, for example Facebook, Twitter, Experian, etc. In some examples, the default location may be the central facility 170. The example machine-readable instructions 800 of FIG. 8 then terminate, and the transmitter 350 of FIG. 3 proceeds to transmit the metadata and user identifier associated with the destination via the dummy request (block 760 of FIG. 7).

Figure 9:
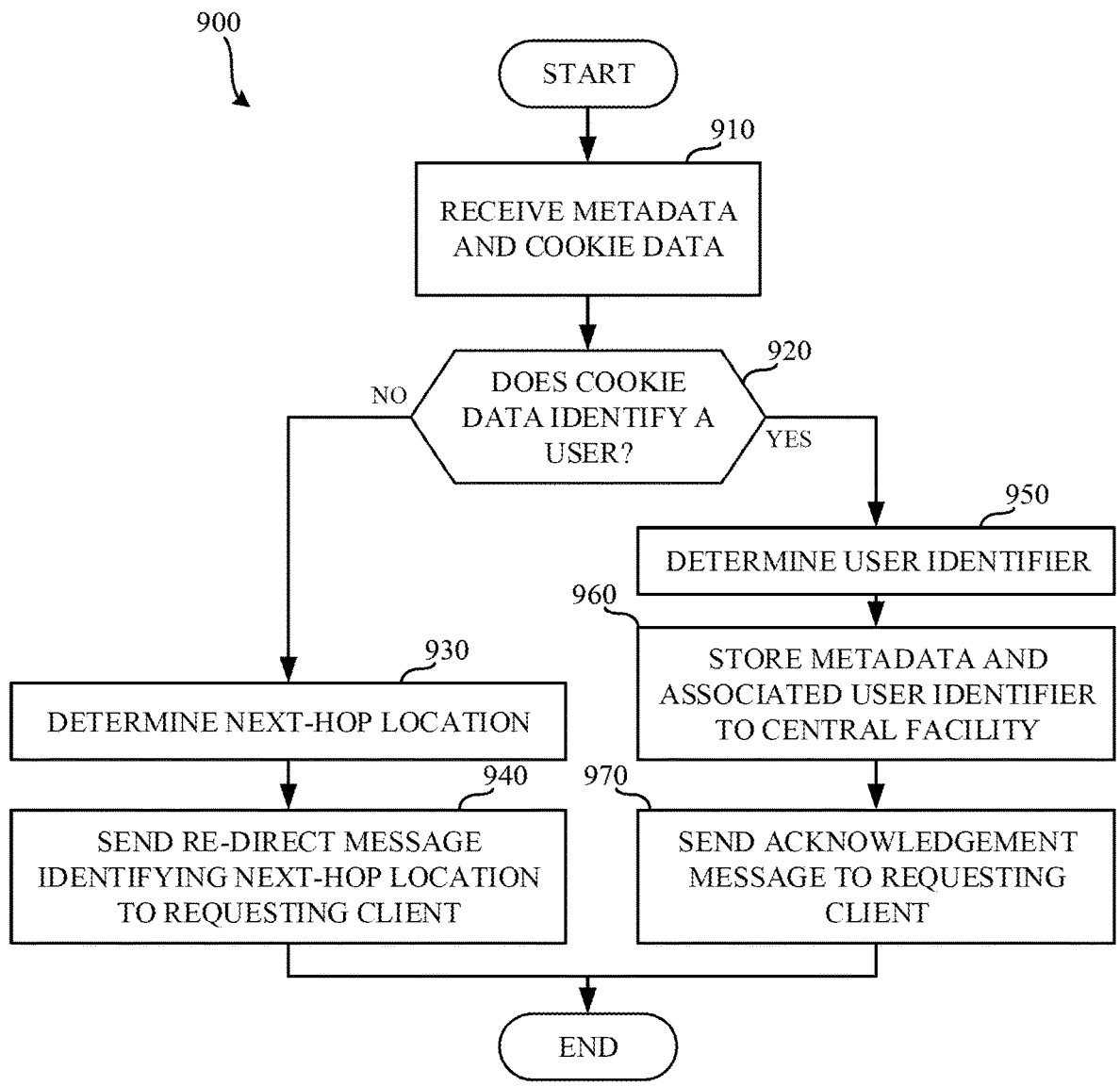
FIGS. 9 and 10 are flowcharts representative of example machine-readable instructions which may be executed to implement the example database proprietor of FIGS. 1, 2, 2A, and/or 4.

FIG. 9 is a flowchart representative of example machine-readable instructions 900 which may be executed to implement the example database proprietor 180, 182 of FIGS. 1, 2, 2A, and/or 4. In some examples, the example instructions 900 of the illustrated example of FIG. 9 may be executed to implement the example central facility 170 of FIGS. 1, 2, 2A, and/or 4A. Execution of the example machine-readable instructions 900 of FIG. 9 begins when the HTTP server 410 of the database proprietor 180 of FIG. 4 receives a dummy request from the browser (e.g. the dummy request 187 of FIG. 1) (block 910). The dummy request includes media identifying metadata, and may additionally include user-identifying data such as, for example, the user identifier 166A, 166B. Based on the received user identifier and/or the absence of user identifier, the user ID comparator 440 determines whether the user identifier 168A, 166B identifies a user known to the database proprietor 180 (block 920). To make such a determination, the user ID comparator 440 may query the demographic information database 430 to determine whether a user identifier and/or any other information associated with the cookie 166A, 166B can be used to identify the user. If the cookie data cannot be used to identify the user (block 920), the user ID comparator 440 determines a next hop location to which the browser 165 should be directed (block 930). The next hop location may be, for example, a different database proprietor 182, the central facility 170, etc. For example, in the illustrated example of FIG. 2, the database proprietor A 180 cannot identify the user and, accordingly, identifies the database proprietor B 182 as the next hop location. Using the next hop location, the HTTP server 410 sends a redirect message to the browser 165 identifying the next hop location (block 940). Again referring to FIG. 2, the redirect message is represented by line 191. In some examples, the browser 165 may be directed to multiple database proprietors (e.g., a first database proprietor redirects the browser to a second database proprietor, which redirects the browser to a third database proprietor, etc.).

If the user identifier data can be used to identify the user (block 920), the user ID comparator 440 determines the user identifier (block 950). The metadata processor 450 then stores the received metadata and the associated user identifier in the metadata database 460. (block 960). In the illustrated example, the metadata processor 450 stores the media identifying metadata (e.g., the ID3 tag) and the user identifier. When storing the metadata and the user identifier, the metadata processor 450 may store an impression record in a similar fashion to, for example, the table 1070 of FIG. 10A. In some examples, the metadata processor 450 stores a timestamp to facilitate identification of the time of presentation of the media.

The HTTP server 410 then transmits an acknowledgment message to the requesting client (block 970). Transmitting the acknowledgment message notifies the requesting client (e.g., the browser 165) that no further action need be taken with respect to the dummy request. In some examples, the database proprietor 180 sends a redirect message instructing the browser 165 to contact a second database proprietor 182 even if the database proprietor 180 was able to identify the user. Such redirection may enable different database proprietors, who may store different types of demographic data (e.g., financial data, geographic data, etc.), to collect a larger data set of demographic data than could be collected by a single database proprietor.

Figure 10:
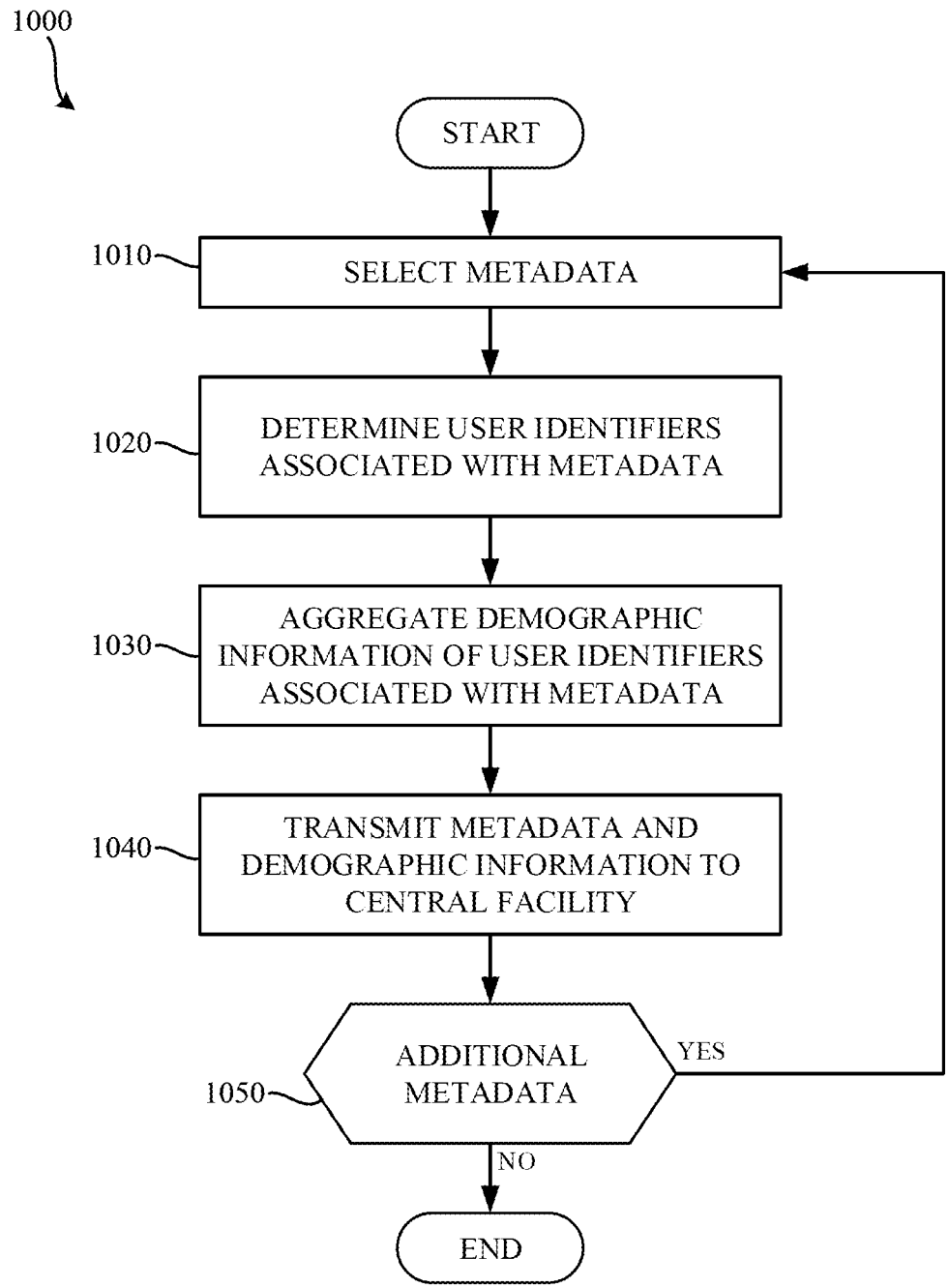

FIG. 10 is a flowchart representative of example machine-readable instructions 1000 which may be executed to implement the example database proprietor 180, 182 of FIGS. 1, 2, 2A, and/or 4. Execution of the example machine-readable instructions 1000 of FIG. 10 begins when the metadata processor 450 selects metadata stored in the metadata database 460 that is associated with a threshold number of users (e.g., twenty users, one hundred users, etc.) (block 1010). The impression data may be formatted in a similar fashion to, for example, the impression records shown in the example table 1070 of FIG. 10A. The metadata processor 450 then determines user identifiers associated with the selected metadata (block 1020). Based on the identified user identifiers, the metadata processor 450 aggregates demographic information associated with the identified user identifiers (block 1030). The demographic information may be stored in a similar fashion to, for example, the demographic information shown in the example table 1080 of FIG. 10B. The aggregated demographic information is transmitted in association with the selected metadata (e.g., the ID3 tag) to the central facility 170 by the metadata transmitter 470 (block 1040). The aggregated demographic information and media identifier may be transmitted to the central facility in a format similar to, for example, the example table 1089 of FIG. 10C. The metadata processor 450 then determines whether additional metadata is stored in the metadata database that meets the threshold requirements for transmission to the central facility 170 (block 1050). If additional metadata exists, the metadata processor selects the metadata (block 1010). If no additional metadata exists, the process terminates. While in the illustrated example of FIG. 10 demographic information is transmitted to the central facility 170 independent of a request from the central facility 170, in some examples, the central facility 170 may request demographic information associated with particular metadata from the database proprietor 180.

FIG. 10A is a table 1070 representative of impression data recorded by the example database proprietor 180. The example table 1070 includes a first column 1071 for storing a media identifier (e.g., an ID3 tag), a second column 1072 for storing a user identifier, and a third column 1073 for storing a timestamp. While in the illustrated example, three columns are shown, any other columns for storing any other information may additionally or alternatively be used such as, for example, a column for storing an Internet Protocol address of the client device, a column for storing a service provider identifier, etc.

In the illustrated example of FIG. 10A, the example table 1070 includes a first row 1074 of impression data, a second row 1075 of impression data, a third row 1076 of impression data, a fourth row 1077 of impression data, and a fifth row 1078 of impression data. However, any other number of records may additionally or alternatively be stored. For example, the example table may include ten thousand rows of data corresponding to ten thousand recorded impressions. In the illustrated example of FIG. 10A, the first example row 1074 identifies that a first media was presented to a first user (e.g., media 0001 was presented to user A). The second example row 1075 identifies that the first media was presented to a second user. The third example row 1076 identifies that the first media was presented to a third user. The fourth example row 1077 identifies that a second media was presented to the first user. The fifth example row 1078 identifies that the second media was presented to a fourth user. In some examples, the media identifier (e.g., media 0001) is encrypted so that the database proprietor can determine that the media identifier corresponds to the same media but cannot determine the identity of the media.

FIG. 10B is a table 1080 representative of demographic information stored by the database proprietor 180. The example table 1080 includes a first column 1082 storing the user identifier (e.g., the user identifier of the first column 1072 of FIG. 10A), a second column 1083 storing first demographic information (e.g., an age), and a third column 1085 storing second demographic information (e.g., an income). While in the illustrated example of FIG. 10B there are two columns storing demographic information, any other number of columns storing any other information may additionally or alternatively be used. For example, additional columns storing other demographic information (e.g., ethnicity, mailing address, sex, etc.) may be used. Additionally or alternatively, columns storing user information (e.g., a user account creation date, a "last accessed" date, user preferences, etc.) may be used.

In the illustrated example, four user records are shown. A first user record 1085 represents user A. A second user record 1086 represents user B. A third user record 1087 represents user C. A fourth record 1087 represents user D. While in the illustrated example of FIG. 10B, four user records are shown, any other number of records may additionally or alternatively be used. For example, the database proprietor may store fifty thousand records respectively associated with fifth thousand users.

FIG. 10C is a table 1089 representative of aggregated media presentation information as transmitted to the central facility 170 by the database proprietor 180. As described in connection with FIG. 10, the database proprietor aggregates demographic information (e.g., the demographic information of the example table 1080 of FIG. 10B in association with the media impression data of the example table 1070 of FIG. 10A). The example table 1089 represents aggregated demographic data showing a number of impressions associated with various demographics and different media identifiers.

The example table 1089 of FIG. 10C includes a first column 1090 representing the media identifier. The example table 1089 includes a second column representing a count (e.g., a sum) of the number of users exposed to the media identified by the media identifier of the first column 1090 who are under the age of twenty. The example table 1089 includes a third column representing a count (e.g., a sum) of the number of users exposed to the media identified by the media identifier of the first column 1090 who are between the ages of twenty and forty. The example table 1089 includes a fourth column representing a count (e.g., a sum) of the number of users exposed to the media identified by the media identifier of the first column 1090 who are between the ages of forty and sixty. The example table 1089 includes a fifth column representing a count (e.g., a sum) of the number of users exposed to the media identified by the media identifier of the first column 1090 who are over the age of sixty. While in the illustrated example ages are divided into ranges of twenty years, any other range (e.g., one year, two years, five years, ten years, etc.) may be used.

In the illustrated example of FIG. 10C, the example table 1089 includes a sixth column representing a count (e.g., a sum) of the number of users exposed to the media identified by the media identifier of the first column 1090 who have an income under forty thousand dollars per year. The example table 1089 includes a seventh column representing a count (e.g., a sum) of the number of users exposed to the media identified by the media identifier of the first column 1090 who have an income between forty thousand and eighty thousand dollars per year. The example table 1089 includes an eighth column representing a count (e.g., a sum) of the number of users exposed to the media identified by the media identifier of the first column 1090 who have an income over eighty thousand dollars per year. While in the illustrated example incomes are divided into ranges of forty thousand dollars, any other ranges and/or divisions may additionally or alternatively be used. Furthermore, while in the illustrated example of FIG. 10C demographic information for age and income is aggregated, any other demographic information may additionally or alternatively be aggregated. Further, although age and income are shown separately, other combinations are possible (e.g., persons age 40-60 with income from 40 k-60 k per year).

Figure 11:
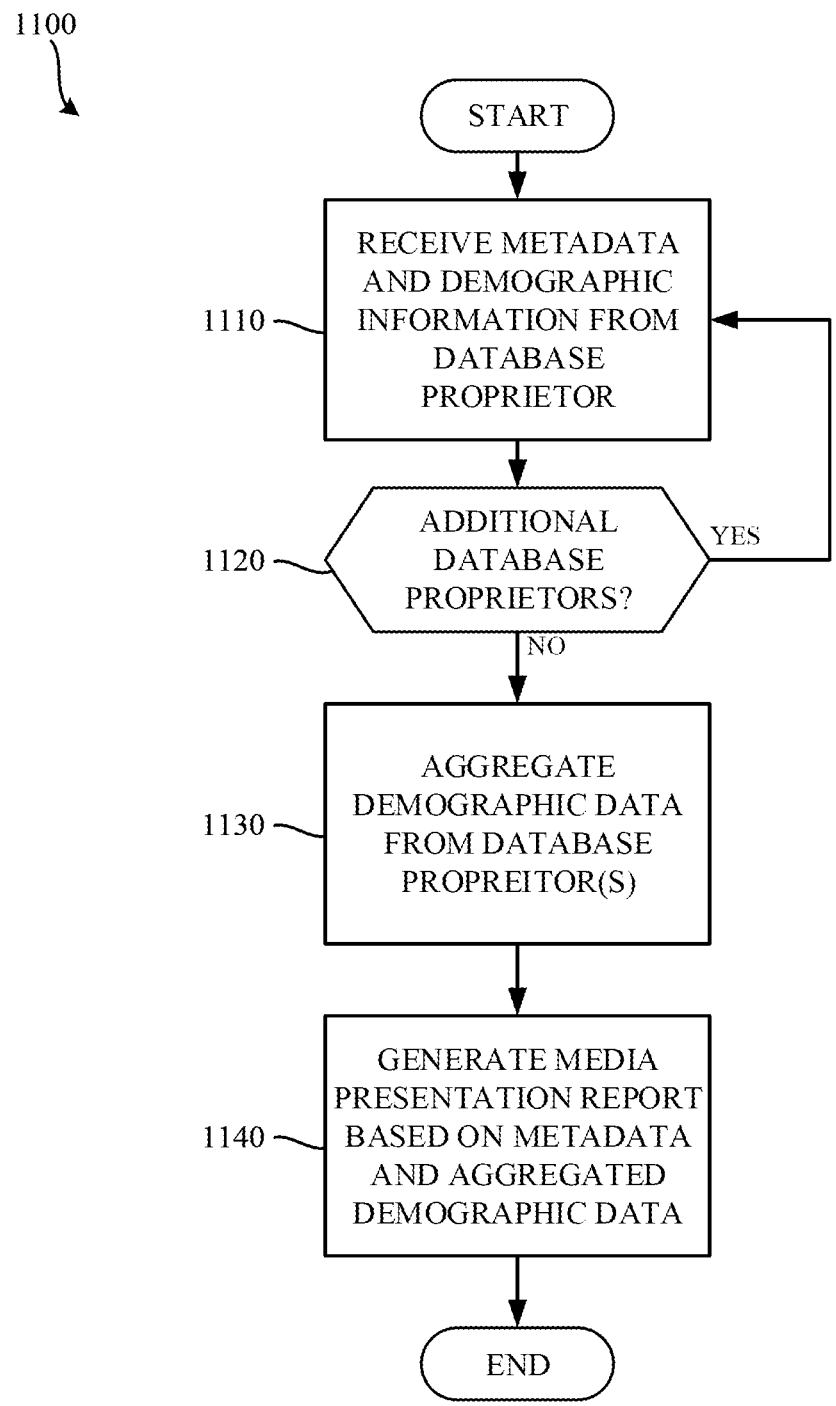
FIG. 11 is a flowchart representative of example machine-readable instructions which may be executed to implement the example central facility of FIGS. 1, 2, 2A, and/or 4A.

FIG. 11 is a flowchart representative of example machine-readable instructions 1100 which may be executed to implement the example central facility 170 of FIGS. 1 and/or 2. execution of the example machine-readable instructions 1100 of FIG. 11 begins when the central facility 170 receives metadata (which may be encrypted and/or formatted as an ID3 tag) and demographic information associated with the metadata from a database proprietor 180, 182 (block1110). In the illustrated example, the data receiver 481 of the example central facility 170 receives metadata from the database proprietors 180, 182 without having first requested such data from the database proprietors. That is, the database proprietors 180, 182 send the associated demographic information to the central facility 170 on their own accord. The metadata processor 451 of the example central facility 170 then determines whether data from additional database proprietors should be received before proceeding (block 1120). For example, while the data receiver 481 of the example central facility 170 may have received data from a single database proprietor, receiving metadata and demographic information from multiple database proprietors may result in a more accurate report of the demographic exposure associated with the presented media. In some examples, the media-identifying metadata received in association with the demographic information may be encrypted. In such examples, the metadata processor 451 decrypts the encrypted media-identifying metadata to enable identification of the media.

If data has been received from a sufficient number of database proprietors (block 1120), the metadata processor 451 aggregates the demographic data from the database proprietor(s) (block 1130). The metadata processor 451 then generates a media presentation report based on the metadata and the aggregated demographic information (block 1140).

Figure 12:
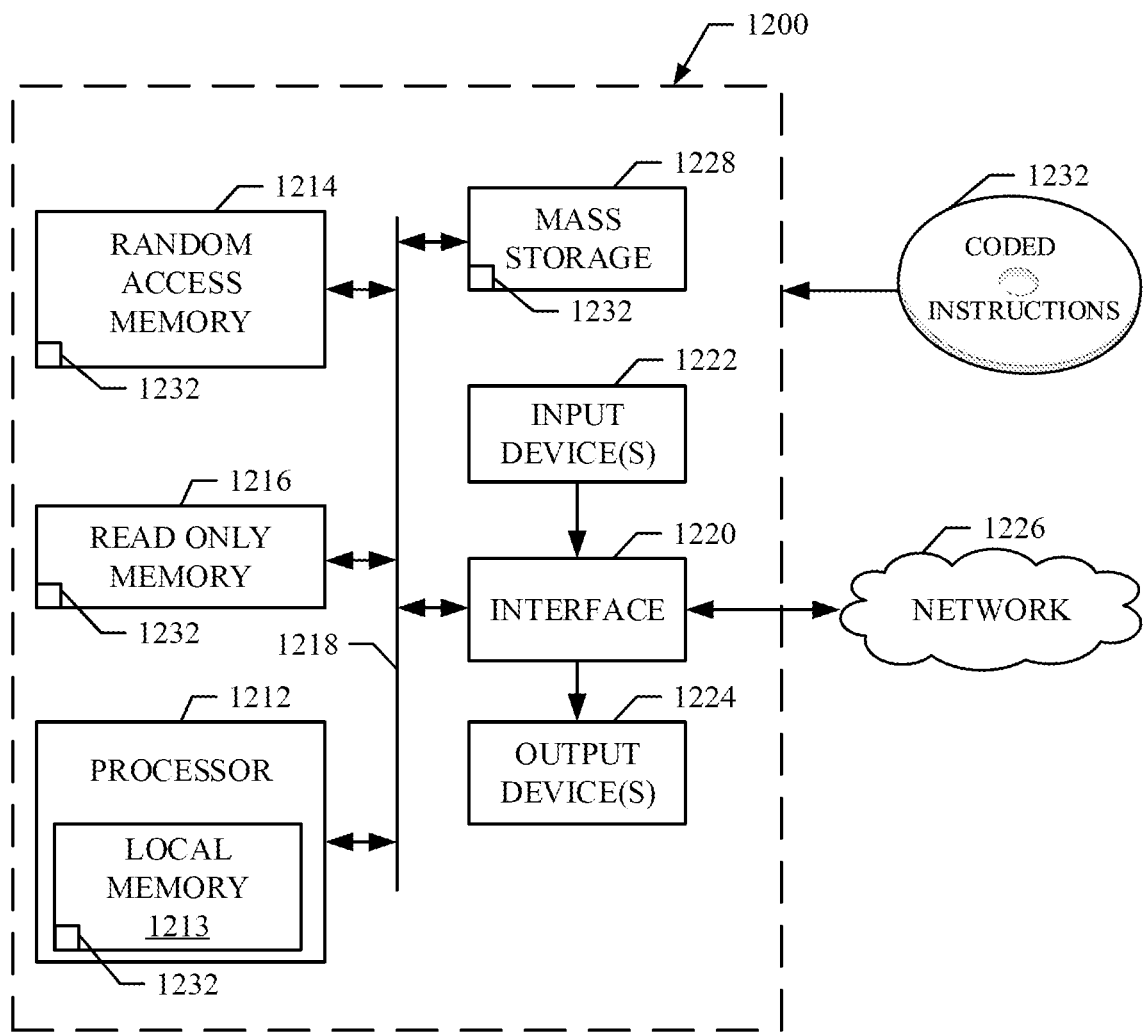
FIG. 12 is a block diagram of an example processor platform capable of executing the example machine-readable instructions of FIGS. 6, 7, 8, 9, 10, and/or 11 to implement the example service provider of FIGS. 1 and/or 2, the example browser of FIGS. 1, 2, 2A, and/or 3, the example database proprietor of FIGS. 1, 2, 2A, and /or 4, and/or the example central facility of FIGS. 1, 2, 2A, and/or 4A.

FIG. 12 is a block diagram of an example processor platform 1000 capable of executing the instructions of FIGS. 6, 7, 8, 9, 10, and/or 11 to implement the example service provider 120 of FIGS. 1 and/or 2, the example browser 165 of FIGS. 1, 2, and/or 3, and/or the example database proprietor 180, 182 of FIGS. 1, 2, and/or 4. The processor platform 1200 can be, for example, a server, a personal computer, a mobile device (e.g., a cell phone, a smart phone, a tablet such as an iPadTM), a personal digital assistant (PDA), an Internet appliance, a DVD player, a CD player, a digital video recorder, a Blu-ray player, a gaming console, a personal video recorder, a set top box, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIGS. 6, 7, 8, 9, 10, and/or 11may be stored in the mass storage device 1228, in the volatile memory 1214, in the non-volatile memory 1216, and/or on a removable tangible computer readable storage medium such as a CD or DVD.

From the foregoing, it will be appreciated that the above disclosed methods, apparatus and articles of manufacture enable monitoring of media presentations and association of demographic information provided by one or more database proprietors with the same. In particular, media identifying metadata (which may be encrypted and/or formatted as an ID3 tag) and user identifying information is transmitted to database proprietors by client devices in response to detecting a media presentation. The database proprietors aggregate demographic information (based on the user identifying information) in association with the presented media, and report the demographic information and the media-identifying information to an audience measurement entity.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. A computing system comprising:
a processor; and
a non-transitory computer-readable storage medium, having stored thereon program instructions that, upon execution by the processor, cause performance of operations comprising:
accessing metadata identifying media presented on a client device, wherein the metadata identifying media presented on the client device is associated with user-identifying data corresponding to at least one of the client device or a user of the client device;
making a comparison between the user-identifying data and identifying data of a set of known users associated with respective demographic information;
making a determination that the user-identifying data does not correspond to identifying data of the set of known users based on the comparison; and
based on making the determination, instructing the client device to provide the metadata to a redirect location.

2. The computing system of claim 1, wherein the redirect location identifies a domain associated with a database proprietor.

3. The computing system of claim 1, wherein the user-identifying data includes a cookie.

4. The computing system of claim 1, wherein the metadata identifying media is stored within an ID3 tag associated with the media presented on the client device.

5. The computing system of claim 1, wherein the media presented on the client device is presented using a browser application installed on the client device.

6. The computing system of claim 1, wherein the client device is a mobile phone, and wherein the user-identifying data includes a device identifier corresponding to the mobile phone.

7. The computing system of claim 1, wherein the operations further include instructing the client device to provide the user-identifying data to the redirect location.

8. The computing system of claim 1, wherein the operations further include instructing the client device to provide second user-identifying data to the redirect location, the second user-identifying data associated with the redirect location.

9. The computing system of claim 8, wherein the second user-identifying information includes a cookie associated with a domain of the redirect location.

10. The computing system of claim 1, wherein the operations further include instructing the client device to select the redirect location.

11. The computing system of claim 1, wherein the operations further include, in response to instructing the client device, receiving, from the redirect location, media monitoring information associated with the presented media, wherein the media monitoring information includes demographic information that is at least partially associated with the media presented on the client device.

12. A computer-implemented method comprising:
accessing metadata identifying media presented on a client device, wherein the metadata identifying media presented on the client device is associated with user-identifying data corresponding to at least one of the client device or a user of the client device;
making a comparison between the user-identifying data and identifying data of a set of known users associated with respective demographic information;
making a determination that the user-identifying data does not correspond to identifying data of the set of known users based on the comparison; and
based on making the determination, instructing the client device to provide the metadata to a redirect location.

13. The computer-implemented method of claim 12, wherein the metadata identifying media is stored within an ID3 tag associated with the media presented on the client device.

14. The computer-implemented method of claim 12, further including instructing the client device to provide the user-identifying data to the redirect location.

15. The computer-implemented method of claim 12, further including instructing the client device to provide second user-identifying data to the redirect location, the second user-identifying data associated with the redirect location.

16. The computer-implemented method of claim 12, further including, in response to instructing the client device, receiving, from the redirect location, media monitoring information associated with the presented media, wherein the media monitoring information includes demographic information that is at least partially associated with the media presented on the client device.

17. A non-transitory computer-readable storage medium, having stored thereon program instructions that, upon execution by a processor, cause performance of operations comprising,
accessing metadata identifying media presented on a client device, wherein the metadata identifying media presented on the client device is associated with user-identifying data corresponding to at least one of the client device or a user of the client device;
making a comparison between the user-identifying data and identifying data of a set of known users associated with respective demographic information;
making a determination that the user-identifying data does not correspond to identifying data of the set of known users based on the comparison; and
based on making the determination, instructing the client device to provide the metadata to a redirect location.

18. The non-transitory computer-readable storage medium of claim 17, wherein the operations further include instructing the client device to provide the user-identifying data to the redirect location.

19. The non-transitory computer-readable storage medium of claim 17, wherein the operations further include instructing the client device to provide second user-identifying data to the redirect location, the second user-identifying data associated with the redirect location.

20. The non-transitory computer-readable storage medium of claim 17, wherein the operations further include, in response to instructing the client device, receiving, from the redirect location, media monitoring information associated with the presented media, wherein the media monitoring information includes demographic information that is at least partially associated with the media presented on the client device.

* * * * *